US009293752B2

(12) United States Patent
Murata et al.

(10) Patent No.: US 9,293,752 B2
(45) Date of Patent: Mar. 22, 2016

(54) MULTILAYER POROUS MEMBRANE AND PRODUCTION METHOD THEREOF

(75) Inventors: Hiroshi Murata, Tokyo (JP); Hirosuke Naruto, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 829 days.

(21) Appl. No.: 12/525,232

(22) PCT Filed: Jan. 23, 2008

(86) PCT No.: PCT/JP2008/050874

§ 371 (c)(1), (2), (4) Date: Jan. 26, 2010

(87) PCT Pub. No.: WO2008/093575

PCT Pub. Date: Aug. 7, 2008

(65) Prior Publication Data

US 2010/0285348 A1 Nov. 11, 2010

(30) Foreign Application Priority Data

Jan. 30, 2007 (JP) ................................ 2007-019352
Jan. 30, 2007 (JP) ................................ 2007-019353
Jan. 30, 2007 (JP) ................................ 2007-019354
Jan. 30, 2007 (JP) ................................ 2007-019355
Jun. 19, 2007 (JP) ................................ 2007-161102

(51) Int. Cl.

| | |
|---|---|
| ***H01M 2/14*** | (2006.01) |
| ***H01M 2/16*** | (2006.01) |
| ***H01M 2/18*** | (2006.01) |
| ***B32B 27/20*** | (2006.01) |
| ***B32B 27/32*** | (2006.01) |
| ***H01G 9/02*** | (2006.01) |
| ***H01M 10/05*** | (2010.01) |
| ***B32B 5/16*** | (2006.01) |
| ***B32B 25/02*** | (2006.01) |
| ***B32B 25/04*** | (2006.01) |
| ***B32B 25/08*** | (2006.01) |
| ***B32B 25/14*** | (2006.01) |
| ***B32B 27/08*** | (2006.01) |

(Continued)

(52) U.S. Cl.

CPC ............... *H01M 2/1653* (2013.01); *B32B 5/16* (2013.01); *B32B 25/02* (2013.01); *B32B 25/042* (2013.01); *B32B 25/047* (2013.01); *B32B 25/08* (2013.01); *B32B 25/14* (2013.01); *B32B 27/08* (2013.01); *B32B 27/14* (2013.01); *B32B 27/16* (2013.01); *B32B 27/18* (2013.01); *B32B 27/20* (2013.01); *B32B 27/22* (2013.01); *B32B 27/28* (2013.01); *B32B 27/281* (2013.01); *B32B 27/285* (2013.01); *B32B 27/286* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *H01G 9/02* (2013.01); *H01M 2/166* (2013.01); *H01M 2/1686* (2013.01); *H01M 10/05* (2013.01); *B32B 2260/025* (2013.01); *B32B 2260/046* (2013.01); *B32B 2262/101* (2013.01); *B32B 2264/10* (2013.01); *B32B 2264/102* (2013.01); *B32B 2264/104* (2013.01); *B32B 2264/107* (2013.01); *B32B 2270/00* (2013.01); *B32B 2307/206* (2013.01); *B32B 2307/306* (2013.01); *B32B 2307/514* (2013.01); *B32B 2307/714* (2013.01); *B32B 2307/724* (2013.01); *B32B 2307/736* (2013.01); *B32B 2457/10* (2013.01); *H01G 9/155* (2013.01); *H01M 10/0525* (2013.01); *Y10T 428/2495* (2015.01); *Y10T 428/249986* (2015.04)

(58) Field of Classification Search

CPC . H01M 2/166; H01M 2/1686; H01M 2/1653; B32B 27/20; B32B 27/32
USPC ............................... 429/144; 428/213, 317.9
See application file for complete search history.

(56) References Cited

U.S. PATENT DOCUMENTS 5,645,956 A * 7/1997 Degen et al. ................. 429/142
5,830,603 A 11/1998 Oka et al.

(Continued)

FOREIGN PATENT DOCUMENTS

CN 1294607 A 5/2001
EP 1 464 669 A1 10/2004

(Continued)

OTHER PUBLICATIONS

Murai et al., Machine translation of WO 99/31750 A1, Jun. 1999.*

(Continued)

*Primary Examiner* — Sean P Cullen
(74) *Attorney, Agent, or Firm* — Finnegan, Henderson, Farabow, Garret & Dunner, L.L.P.

(57) ABSTRACT

The present invention provides a multilayer porous membrane having both high safety and practicality, especially as a separator for a non-aqueous electrolyte battery and comprising a porous layer containing an inorganic filler and a resin binder on at least one surface of a polyolefin resin porous membrane, wherein the porous layer simultaneously satisfies the following (A) to (C):

(A) the inorganic filler has an average particle diameter of 0.1 μm or more and 3.0 μm or less,
(B) a ratio of an amount of the resin binder to a total amount of the inorganic filler and the resin binder is 1% or more and 8% or less in terms of volume fraction, and
(C) a ratio of a layer thickness of the porous layer to a total layer thickness is 15% or more and 50% or less.

5 Claims, No Drawings

(51) Int. Cl.

| | |
|---|---|
| ***B32B 27/14*** | (2006.01) |
| ***B32B 27/16*** | (2006.01) |
| ***B32B 27/18*** | (2006.01) |
| ***B32B 27/22*** | (2006.01) |
| ***B32B 27/28*** | (2006.01) |
| ***B32B 27/30*** | (2006.01) |
| ***B32B 27/34*** | (2006.01) |
| ***B32B 27/36*** | (2006.01) |
| *H01G 9/00* | (2006.01) |
| *H01M 10/0525* | (2010.01) |

(56) References Cited

U.S. PATENT DOCUMENTS

| | | | | |
|---|---|---|---|---|
| 6,232,014 | B1 | 5/2001 | Shiota et al. | |
| 6,387,565 | B1 | 5/2002 | Aihara et al. | |
| 6,566,012 | B1 | 5/2003 | Takita et al. | |
| 6,723,467 | B2 | 4/2004 | Yoshida et al. | |
| 2006/0188785 | A1 * | 8/2006 | Inoue et al. | 429/246 |
| 2010/0068612 | A1 * | 3/2010 | Nishikawa | 429/129 |

FOREIGN PATENT DOCUMENTS

| | | | | |
|---|---|---|---|---|
| JP | 04-212265 | A | | 8/1992 |
| JP | 09-237622 | | | 9/1997 |
| JP | 10-172531 | | | 6/1998 |
| JP | 11-80395 | | | 3/1999 |
| JP | 11-129379 | A | | 5/1999 |
| JP | 2000-40499 | | | 2/2000 |
| JP | 2001-164018 | A | | 6/2001 |
| JP | 3393145 | | | 1/2003 |
| JP | 3426253 | | | 5/2003 |
| JP | 2003-217554 | | | 7/2003 |
| JP | 2004-227972 | | | 8/2004 |
| JP | 2004-352863 | A | | 12/2004 |
| JP | 2005-129437 | | | 5/2005 |
| JP | 2005/276503 | | | 10/2005 |
| JP | 2005-330398 | A | | 12/2005 |
| JP | 3752913 | | | 12/2005 |
| JP | 3756815 | | | 1/2006 |
| JP | 2006027024 | A | * | 2/2006 |
| JP | 3797729 | | | 4/2006 |
| JP | 2006-124652 | A | | 5/2006 |
| JP | 2006-321841 | | | 11/2006 |
| WO | WO 99/31750 | | | 6/1999 |
| WO | WO 2006/068428 | A1 | | 6/2006 |

OTHER PUBLICATIONS

Hatayama, H., Machine translation of JP 2006-027024 A, Feb. 2006.*

Inagaki et al., Machine translation of JP 2006-321841 A, Nov. 2006.*

Sheng Shui Zhang, "A review on the separators of liquid electrolyte Li-ion batteries," Journal of Power Sources 164 (2007) pp. 351-364.

Supplementary Partial European Search Report dated Apr. 7, 2011 issued in corresponding International Application No. 08703715.6-1227.

Office Action dated Jun. 24, 2011 issued in the corresponding Taiwanese patent application.

Notice of Observation Submission for Application No. 08703715.6 dated Aug. 30, 2012.

Office Action for CN Application No. 201210146602.9 dated Jan. 26, 2014.

* cited by examiner

MULTILAYER POROUS MEMBRANE AND PRODUCTION METHOD THEREOF

TECHNICAL FIELD

The present invention relates to a multilayer porous membrane, a separator for a non-aqueous electrolyte battery, a non-aqueous electrolyte battery and a production method of the multilayer porous membrane.

BACKGROUND ART

Since a polyolefin porous membrane exhibits excellent electrical insulation properties or ion permeability, it has been widely used as a separator in a battery or a capacitor or the like. In recent years, with the multifunctionalization and weight reduction of portable appliances, a high-power-density and high-capacity-density lithium-ion secondary battery has been used as an electric power source for the appliances. A polyolefin porous membrane is frequently used as a separator in such a high-power-density and high-capacity-density lithium-ion secondary battery.

Here, an organic solvent is usually used as the electrolyte in a lithium-ion secondary battery. Therefore, when an abnormal condition such as short-circuiting or overcharging happens to a lithium-ion secondary battery, the electrolyte can be decomposed to cause ignition in the worst case. In order to prevent such conditions, several safety features are incorporated in a lithium-ion secondary battery. Examples of the safety features may include the shutdown function of a separator.

The term "shutdown function" means that when a battery causes abnormal heat generation, the micropores of a separator are occluded by thermal fusion and the like to suppress the ionic conduction in an electrolyte and stop the progress of the electrochemical reaction. It is generally said that the lower the shutdown temperature, the higher the safety. Since polyethylene has an appropriate shutdown temperature, it is preferably used as a component of a separator.

However, the amount of heat generated when thermal runaway occurs may be large in a battery having a high energy. If the temperature continues to increase beyond the shutdown temperature, both electrodes are short-circuited by membrane breakage (hereinafter, also referred to as "short-circuit") of a separator and further heat generation is likely to occur.

Under such circumstances, there is proposed a method in which a layer mainly composed of an insulating inorganic filler is formed between a separator and an electrode (Patent Documents 1, 2, 3, 4, 5, 6 and 7). In addition, these Patent Documents describe a method in which an inorganic filler layer is formed on a separator surface by applying a dispersion solution containing an inorganic filler and a resin binder on the separator surface which is a porous membrane.

Here, Patents Documents 1, 3 and 4 describe a method in which polyvinyl alcohol is used as a binder in a layer mainly composed of the insulating inorganic filler. In addition, Patent Documents 8, 9 and 10 describe a method in which polyvinyl alcohol is used as an adhesive for bonding between an electrode layer and a separator. Further, Patent Document 11 describes a method in which when a thin membrane composed only of an inorganic material is formed on a hole wall surface of a polyolefin porous membrane, adhesiveness of the hole wall surface is increased by surface treatment and thereby preventing peeling of the thin membrane composed only of an inorganic material.

Patent Document 1: Japanese Patent No. 3756815
Patent Document 2: Japanese Patent No. 3752913
Patent Document 3: Japanese Patent Laid-Open No. 2005-276503
Patent Document 4: Japanese Patent Laid-Open No. 2004-227972
Patent Document 5: Japanese Patent Laid-Open No. 2004-040499
Patent Document 6: Japanese Patent Laid-Open No. 11-080395
Patent Document 7: Japanese Patent Laid-Open No. 09-237622
Patent Document 8: Japanese Patent No. 3426253
Patent Document 9: Japanese Patent No. 3393145
Patent Document 10: WO99/31750
Patent Document 11: Japanese Patent No. 3797729

DISCLOSURE OF THE INVENTION

Problems to be Solved by the Invention

However, when an inorganic filler layer is formed on a separator surface by applying a dispersion solution containing an inorganic filler and a resin binder on the separator surface which is a porous membrane, the resin binder for bonding the inorganic filler and the inorganic filler enter into fine pores of the separator to occlude many fine pores, thereby sometimes reducing the permeability of the separator. If the permeability of the separator is reduced, the charge and discharge characteristics tend to be decreased. The occlusion of such fine pores is likely to occur as the layer thickness of the inorganic filler layer is large and as the ratio of the resin binder to the inorganic filler is large.

On the other hand, if the layer thickness of the inorganic filler layer is excessively reduced, when the temperature continues to increase beyond the shutdown temperature, membrane breakage of both the melted separator and the inorganic filler layer may occur. The membrane breakage may cause short-circuiting of both electrodes. In addition, if the ratio of a resin binder to an inorganic filler is excessively small, the inorganic filler may not be sufficiently bonded. If the inorganic filler is insufficiently bonded, the inorganic filler easily tends to peel off and drop off from the separator surface.

In addition, if the thermal shrinkage force of a polyolefin porous membrane on which an inorganic filler layer is laminated is excessive large, when the temperature continues to increase beyond the shutdown temperature, membrane breakage of both the melted separator and the inorganic filler layer may occur. The membrane breakage may cause short-circuiting of both electrodes. The membrane breakage tends to notably occur as the rate of temperature rising is large. On the other hand, if the layer thickness of the inorganic filler layer on the separator surface is excessively increased in order to prevent the membrane breakage, it may reduce the permeability of the separator.

Further, if a mistake is made in selecting a resin binder in forming an inorganic filler layer or the surface condition of a separator as a substrate on which an organic filler layer is laminated, when the temperature continues to increase beyond the shutdown temperature, there were cases where there occurred a major variation in the temperature (short-circuit temperature) at which both electrodes are short-circuited by membrane breakage and the like, or where the higher short-circuit temperature was difficult to maintain.

An object of the present invention is to provide a multilayer porous membrane excellent in heat resistance and permeability. In addition, another object of the present invention is to provide a production method capable of producing the porous membrane with high productivity, and a separator for a non-aqueous electrolyte battery and a non-aqueous electrolyte battery having high safety and practicality.

Means for Solving the Problems

As a result of earnest studies to solve the above problems, the present inventor has reached the present invention. That is, the present invention is as follows:

[1]

A multilayer porous membrane comprising a porous layer containing an inorganic filler and a resin binder on at least one surface of a polyolefin resin porous membrane, wherein the porous layer simultaneously satisfies the following (A) to (C):

(A) the inorganic filler has an average particle diameter of 0.1 μm or more and 3.0 μm or less, (B) a ratio of an amount of the resin binder to a total amount of the inorganic filler and the resin binder is 0.5% or more and 8% or less in terms of volume fraction, and (C) a ratio of a layer thickness of the porous layer to a total layer thickness is 15% or more and 50% or less.

[2]

The multilayer porous membrane described in [1], wherein a maximum value of a thermal shrinkage force of the polyolefin resin porous membrane is 10 g or less.

[3]

The multilayer porous membrane described in [1] or [2], wherein the resin binder is a polyvinyl alcohol having a degree of saponification of 85% or more.

[4]

The multilayer porous membrane described in [1], [2] or [3], wherein the polyolefin resin porous membrane surface facing the porous layer has a wetting index of 40 mN/m or more.

[5]

A multilayer porous membrane comprising a porous layer containing an inorganic filler and a resin binder on at least one surface of a polyolefin resin porous membrane, wherein a maximum value of a thermal shrinkage force of the polyolefin resin porous membrane is 10 g or less.

[6]

The multilayer porous membrane described in [5], wherein the resin binder is a polyvinyl alcohol having a degree of saponification of 85% or more.

[7]

The multilayer porous membrane described in [5] or [6], wherein the polyolefin resin porous membrane surface facing the porous layer has a wetting index of 40 mN/m or more.

[8]

A multilayer porous membrane comprising a porous layer containing an inorganic filler and a resin binder on at least one surface of a polyolefin resin porous membrane, wherein the resin binder is a polyvinyl alcohol having a degree of saponification of 85% or more.

[9]

The multilayer porous membrane described in [8], wherein the polyolefin resin porous membrane surface facing the porous layer has a wetting index of 40 mN/m or more.

[10]

A multilayer porous membrane comprising a porous layer containing an inorganic filler and a resin binder on at least one surface of a polyolefin resin porous membrane, wherein the polyolefin resin porous membrane surface facing the porous layer has a wetting index of 40 mN/m or more.

[11]

A separator for a non-aqueous electrolyte battery using a multilayer porous membrane according to any of [1] to [10].

[12]

A non-aqueous electrolyte battery using a separator for a non-aqueous electrolyte battery according to [11].

[13]

The method of producing the multilayer porous membrane according to any of [1] to [10], comprising applying a dispersion solution containing an inorganic filler and a resin binder on at least one surface of a polyolefin resin porous membrane.

Advantages of the Invention

The present invention provides a multilayer porous membrane excellent in heat resistance and permeability. In addition, the present invention provides a production method capable of producing the porous membrane with high productivity, and a separator for a non-aqueous electrolyte battery and a non-aqueous electrolyte battery having high safety and practicality.

BEST MODE FOR CARRYING OUT THE INVENTION

Hereinafter, there will be described the best mode (hereinafter abbreviated as an "embodiment") for carrying out the present invention. In addition, the present invention is not limited to the following embodiments, and various modifications can be made within the range of the gist of the present invention.

The multilayer porous membrane of the present embodiment comprises a porous layer containing an inorganic filler and a resin binder on at least one surface of a polyolefin resin porous membrane.

[Polyolefin Resin Porous Membrane]

The polyolefin resin porous membrane of the present embodiment is formed by a polyolefin resin composition containing a polyolefin resin as a main component. It is preferable that the polyolefin resin composition contains a polyolefin resin as a main component from the viewpoint of achieving excellent shutdown performance in case of using the porous membrane as a battery separator.

Further, the term "main component" in the present embodiment means that the ratio of a particular component to all components is preferably 50% by mass or more, more preferably 55% by mass or more, further more preferably 60% by mass or more, especially preferably 80% by mass or more and most preferably 90% by mass or more, and may be 100% by mass.

As the polyolefin resin, there may be used a polyolefin resin which is used for usual extrusion molding, injection molding, inflation molding, blow molding, and the like. Examples of the polyolefin resin may specifically include a homopolymer obtained by using ethylene, propylene, 1-butene, 4-methyl-1-pentene, 1-hexene 1-octene, and the like as a monomer, a copolymer or a multistage polymer, and the like. These may be used alone or in combination with two or more kinds.

In addition, examples of the polyolefin resin may include a low-density polyethylene, a linear low-density polyethylene, a medium-density polyethylene, a high-density polyethylene, an ultra-high molecular weight polyethylene, an isotactic polypropylene, an atactic polypropylene, an ethylene-propylene random copolymer, a polybutene and an ethylene-propylene rubber.

Further, the polyolefin resin preferably contains a high-density polyethylene as a main component from the viewpoint of having both a low melting point and high strength as a battery separator of a multilayer porous membrane.

The polyolefin resin has a viscosity average molecular weight of preferably 30000 or more and 12000000 or less, more preferably 50000 or more and less than 2000000 and further more preferably 100000 or more and less than 1000000. It is preferable to adjust the viscosity average molecular weight to 30000 or more from the viewpoint of achieving good formability by setting a large melt tension in melt molding and from the viewpoint of achieving high strength by imparting sufficient entanglement. On the other hand, it is preferable to adjust the viscosity average molecular weight to 12000000 or less from the viewpoint of achieving uniform melting and kneading, good sheet formability and especially good thickness stability. In addition, it is preferable to adjust the viscosity average molecular weight to less than 1000000 from the viewpoint of achieving good shutdown performance so that pores are easily occluded at the time of temperature rising when used as a battery separator.

Here, the method of adjusting the viscosity average molecular weight of the polyolefin resin may include a method of using a single polymer having a particular viscosity average molecular weight as well as a method of using plural polymers having different viscosity average molecular weights. For example, when the viscosity average molecular weight is adjusted to less than 1000000, there may be used, for example, a polyethylene having a viscosity average molecular weight of 2000000 and for example, a polyethylene having a viscosity average molecular weight of 270000 by mixing each other, instead of using a polyolefin having a viscosity average molecular weight of less than 1000000.

In addition, the “viscosity average molecular weight” in the present embodiment is a value measured according to the measurement method described later.

The polyolefin resin composition may contain an inorganic filler. As the inorganic filler, there is preferably used an inorganic filler which has a melting point of 200° C. or higher, has high electrical insulation properties and is electrochemically stable in the range of using a lithium-ion secondary battery.

Examples of the inorganic filler may specifically include oxide-based ceramics such as alumina, silica, titania, zirconia, magnesia, ceria, yttria, zinc oxide and iron oxide; nitride-based ceramics such as silicon nitride, titanium nitride and boron nitride; ceramics such as silicon carbide, calcium carbonate, aluminum sulfate, potassium titanate, talc, kaolin clay, kaolinite, halocite, pyrophyllite, montmorillonite, selicite, mica, amesite, bentonite, asbestos, zeolite, calcium silicate, magnesium silicate, diatomaceous earth and silica sand; and ceramics such as a glass fiber.

These may be used alone or in combination with two or more kinds.

When the inorganic filler is blended in the polyolefin resin, the preferred blending ratio is such that a uniform membrane may be melt-formed in a state where the plasticizer described later is added, a sheet-like porous membrane precursor may be formed and the productivity is not impaired.

The ratio (mass fraction) of the inorganic filler to the total amount of the polyolefin resin and the inorganic filler is preferably 0% or more, more preferably 1% or more, further more preferably 3% or more, especially preferably 5% or more, and the upper limit is preferably 90% or less, more preferably 80% or less, further more preferably 70% or less and especially preferably 60% or less. It is preferable to add an inorganic filler from the viewpoint of improving the affinity with an electrolyte and improving the impregnability of an electrolyte. On the other hand, it is preferable to adjust the mass fraction of an inorganic filler to 90% or less from the viewpoint of capable of forming a uniform and sheet-like porous membrane precursor (described later) by melt film formation without impairing productivity.

In addition, for the polyolefin resin composition, there may be used an antioxidant such as a phenol-based antioxidant, a phosphorus-based antioxidant or a sulfur-based antioxidant, metal soaps such as calcium stearate or zinc stearate, and an additive such as an ultraviolet absorbent, a light stabilizer, an antistatic agent, an antifogging agent and a coloring agent, where necessary.

As a method for producing the polyolefin resin porous membrane, a general production method may be employed without any limitation. Examples of the production method may specifically include (I) a method comprising melting and kneading a polyolefin resin and a plasticizer to form a sheet-like membrane and followed by extracting the plasticizer to make the membrane porous, (II) a method comprising melting and kneading a polyolefin resin to extrude at a high draw ratio and followed by peeling the polyolefin crystal interface by heat treatment and stretching to make the membrane porous, (III) a method comprising melting and kneading a polyolefin resin and an inorganic filler to form a sheet-like membrane and followed by peeling the interface between the polyolefin resin and the inorganic filler by stretching to make the membrane porous, and (IV) a method comprising melting a polyolefin resin and followed by immersing in a poor solvent for the polyolefin resin to solidify the polyolefin resin and simultaneously to remove the solvent to make the membrane porous.

Hereinafter, the above method (I) will be further described.

As the plasticizer used in the above method (I), a nonvolatile solvent which may form a uniform solution at temperatures above the melting point of a polyolefin resin when mixed with the polyolefin resin is preferable. Examples of the plasticizer may include hydrocarbons such as liquid paraffin or paraffin wax, esters such as dioctyl phthalate or dibutyl phthalate, and higher alcohols such as oleyl alcohol or stearyl alcohol, and the like. Especially, it is preferable to use liquid paraffin when a polyolefin resin contains polyethylene as a main component, from the viewpoint that the interface peeling between the liquid paraffin and the polyolefin resin is not likely to occur and uniform stretching is performed because liquid paraffin has a good compatibility with polyethylene.

The blending ratio of the plasticizer to the polyolefin resin is preferable such that uniformly melting and kneading may be carried out, a sheet-like microporous membrane precursor may be formed and the productivity is not impaired.

The ratio (mass fraction) of the plasticizer to the total amount of the polyolefin resin and the plasticize and if needed, an inorganic filler to be blended is preferably 30% or more and more preferably 40% or more, and the upper limit is preferably 80% or less and more preferably 70% or less. It is preferable to adjust the mass fraction of a plasticizer to 80% or less from the viewpoint of maintaining the melt tension and securing the formability at the time of melt-molding. On the other hand, it is preferable to adjust the mass fraction of a plasticizer to 30% or more from the viewpoint of obtaining a uniform thin membrane. That is, if the mass fraction of a plasticizer is adjusted to 30% or more, the plasticization effect becomes sufficient, the crystal lamellae folded into a crystalline state are efficiently stretched and a uniform and fine pore structure is obtained without breakage of a polyolefin chain even by high-ratio stretching, thereby achieving high film strength. In addition, it is preferable to adjust the mass fraction of a plasticizer to 30% or more from the viewpoint that the extrusion load at the time of extrusion molding tends to be reduced and high productivity is achieved.

As a method for obtaining a melted and kneaded product containing the polyolefin resin and the plasticizer or a melted and kneaded product containing the polyolefin resin, the inorganic filler and the plasticizer, preferable is a method comprising feeding a polyolefin resin alone or a polyolefin resin and other blended products into a resin kneading machine (such as an extruder, a kneader, a Labo Plastomill, a kneading roll, a Banbury mixer), and introducing a plasticizer at an arbitrary ratio while the resin is heat-melted, and followed by kneading to obtain a uniform solution.

Above all, more preferable is a method comprising kneading a polyolefin resin and a plasticizer or a polyolefin resin, an inorganic filler and a plasticizer in advance at a specified ratio by a Henschel mixer or the like, and feeding the kneaded product into an extruder (for example, a twin-screw extruder), and then introducing the remainder of the predetermined amount of the plasticizer at an arbitrary ratio under heat melting (for example, by a method of side feeding, and the like), and followed by further kneading. If these methods are employed, a sheet having more excellent dispersibility may be obtained and high-ratio stretching may be performed without membrane breakage.

In the above method (I), the melted and kneaded product is formed into a sheet-like shape. As the method of producing a sheet-like molded product by extruding the melted and kneaded product and then cooling and solidifying the kneaded product, there may be employed a method comprising extruding a uniform melted product of a polyolefin resin and a plasticizer or a polyolefin resin, an inorganic filler and a plasticizer through a T-die or the like into a sheet-like shape and then the resulting sheet is contacted with a thermal conductive material to cool to a temperature sufficiently below the crystallization temperature of the resin. As the thermal conductive material used for the cooling and solidification, there may be used a metal, water, air or plasticizer itself etc., but especially preferred is a method of cooling the sheet by contacting with rollers made of metal since the thermal conductivity efficiency is highest. In addition, it is more preferable to clip the sheet between rollers when contacted with the rolls made of metal, because the thermal conductivity efficiency is further enhanced, and the sheet is oriented to increase the film strength and further the surface smoothness of the sheet is improved.

The die lip gap in extruding the melted and kneaded product through a T-die into the sheet-like shape is preferably 400 μm or more, more preferably 500 μm or more, and the upper limit is preferably 3000 μm or less and more preferably 2500 μm or less. It is preferable to adjust the die lip gap at 400 μm or more from the viewpoint of preventing the generation of die lip build-up and the like, reducing the effect on membrane quality such as streaks or defects and preventing membrane breakage in the subsequent stretching step. On the other hand, it is preferable to adjust the die lip gap at 3000 or less from the viewpoint of increasing the cooling rate to prevent cooling irregularity and maintaining thickness stability.

A stretching treatment may be carried out for the sheet-like molded product (porous membrane precursor) formed in the above (I) method. As the stretching treatment, either uniaxial stretching or biaxial stretching may be carried out. Among them, biaxial stretching is preferable from the viewpoint of the resulting film strength and the like. When high-ratio stretching is performed in the biaxial direction, the sheet is difficult to break and has a stable structure because the molecules are oriented in the surface direction, and a sheet having a high puncture strength tends to be obtained. In addition, the stretching method may include simultaneous biaxial stretching, sequential biaxial stretching, multistage stretching, multiple stretching and the like, which may be used alone or in combination of them, but most preferred is simultaneous biaxial stretching from the viewpoints of increase in puncture strength, uniform stretching and shutdown capability. The simultaneous biaxial stretching referred here is a technique in which the stretching is performed simultaneously in both the MD and TD directions and the deformation rate (stretching ratio) in each direction may be different. The sequential biaxial stretching is a technique in which the stretching in the MD direction or the TD direction is independently performed. When the stretching is performed in the MD direction or the TD direction, the other direction is in an nonbinding state or in a state of being fixed at a constant length. The stretching ratio is in the range of preferably 20 times or more and 100 times or less, and more preferably 25 times or more and 50 times or less, in terms of area ratio. The stretching ratio in each axial direction is in the range of preferably 4 times or more and 10 times or less in the MD direction and 4 times or more and 10 times or less in the TD direction, and more preferably 5 times or more and 8 times or less in the MD direction and 5 times or more and 8 times or less in the TD direction. It is preferable to adjust the overall area ratio to 20 times or more from the viewpoint of imparting a sufficient strength to a membrane. On the other hand, it is preferable to adjust the overall area ratio to 100 times or less from the viewpoint of preventing membrane breakage securing a high productivity.

In addition, the MD direction in the present embodiment means an extrusion direction of a resin (machine direction and flow direction). Meanwhile, the TD direction means a width direction of a sheet extruded into a sheet-like shape (vertical direction to machine direction).

In the stretching treatment, a rolling step may be concomitantly used. The rolling step is carried out, for example, by a press method using a double belt press machine or the like. It is preferable to adopt the rolling step especially because the orientation of the surface layer portion may be increased. The area ratio by rolling is in the range of preferably 1 time or more and 3 times or less, and more preferably 1 time or more and 2 times or less. It is preferable to adjust the area ratio by rolling to 1 time or more from the viewpoint of increasing the surface orientation and increasing the film strength. Meanwhile, it is preferable to adjust the area ratio by rolling to 3 times or less from the viewpoint of maintaining the orientation difference between the surface layer portion and the central portion at a low level and achieving a uniform porous structure at the layer surface portion and inside portion in the stretching step, as well as from the viewpoint of the industrial production.

In the above (I) method, the plasticizer is extracted from the formed sheet-like molded product (porous membrane precursor) to form a polyolefin resin porous membrane.

The method of extracting the plasticizer may be carried out either by a batch system or by a continuous system. However, it is preferable that the porous membrane precursor is immersed in an extraction solvent to extract the plasticizer and then is sufficiently dried to substantially remove the plasticizer from the porous membrane. In order to prevent the shrinkage of the porous membrane, it is preferable to bond the end portion of the porous membrane during a series of steps of immersing and drying. In addition, it is preferable to reduce the residual amount of the plasticizer in the porous membrane to less than 1% by mass.

As the extraction solvent, a poor solvent for a polyolefin resin and a good solvent for a plasticizer are preferable. In addition, the extraction solvent preferably has a boiling point lower than that of the polyolefin resin porous membrane.

Examples of the extraction solvent may include hydrocarbons such as n-hexane and cyclohexane; halogenated hydrocarbons such as methylene chloride and 1,1,1-trichloroethane; a non-chlorine-based halogenated solvent such as hydrofluoroether and hydrofluorocarbon; alcohols such as ethanol and isopropanol; ethers such as diethyl ether and tetrahydrofuran; and ketones such as acetone and methylethylketone.

Here, as these extraction solvents, there may be used an extraction solvent recovered from the distillation or the like.

In addition, when a plasticizer and an inorganic filler are melted and kneaded, the inorganic filler may be extracted if needed. It is preferable that the extraction solvent in this case is a poor solvent for a polyolefin resin and a good solvent for the inorganic filler, and has a boiling point lower than that of a polyolefin porous membrane.

The production methods of the above (I) to (IV) may comprise a heat treatment step such as heat fixation and thermal relaxation where necessary. The heat treatment step is preferably carried out successively or after stretching step from the viewpoint of preventing the shrinkage of a polyolefin resin porous membrane.

The heat treatment step more specifically includes, for example, a method of heat fixation by a tenter heat fixation machine.

The maximum value of the thermal shrinkage force of the polyolefin resin porous membrane is preferably 10 g or less, more preferably 9 g or less, further more preferably 8 g or less, still further more preferably 7 g or less, especially preferably 6 g or less and most preferably 5 g or less, and the lower limit is preferably 0 g or more. It is preferable to set the maximum value of the thermal shrinkage force within the above range from the viewpoint of achieving both the heat resistance and permeability of the resulting multilayer porous membrane.

In addition, the "maximum value of the thermal shrinkage force" in the present embodiment means the larger value when comparing an MD thermal shrinkage force value and a TD thermal shrinkage force value, as measured by the measurement method "the maximum thermal shrinkage force (g)" of the embodiment described later under the condition of a constant high temperature. In case of a polyolefin porous membrane prepared by a general method, since the MD thermal shrinkage force is larger than the TD thermal shrinkage force, there may be obtained a multilayer porous membrane having a small thermal shrinkage rate at a high temperature in both the MD and TD directions by using a polyolefin resin porous membrane having the maximum value of the MD thermal shrinkage force of 10 g. Such multilayer porous membrane may be suitably used for the application in which dimensional stability is required in both the MD and TD directions at a high temperature. In addition, examples of the application may include a separator for a stack type non-aqueous electrolyte battery.

Examples of the method of adjusting the maximum value of the thermal shrinkage force of the polyolefin resin porous membrane to 10 g or less may include a method of reducing the viscosity average molecular weight of a polyolefin resin to be used, a method of reducing the percentage of a polyolefin resin by increasing the amount of a plasticizer in case of using a plasticizer, a method of adding an inorganic filler into a polyolefin resin, a method of increasing the resin temperature at the time of melt extrusion, a method of reducing the discharging amount at the time of melt extrusion, a method of increasing the lip gap of a die such as a T-die, a method of reducing the stretching ratio in the stretching step, a method of increasing the stretching temperature in the stretching process, a method of decreasing the treatment temperature in the heat treatment step, a method of increasing the relaxation ratio in the heat fixation step, and a method of increasing the relaxation temperature in the heat fixation step. These methods may be employed alone or in combination of two or more.

Among these methods, especially preferred is a method in which the orientation relaxation is performed after heat setting at 120° C. by using a polyolefin resin containing 50% by mass fraction of a high density polyethylene having a viscosity average molecular weight of 100000 or more (securing a melt tension at the time of a high temperature) from the viewpoint of adjusting the maximum value of thermal shrinkage force to 10 g or less while maintaining the film strength of a polyolefin resin porous membrane.

In addition, the production methods of the above (I) to (IV) may comprise a surface treatment step where necessary. It is preferable to perform the surface treatment step from the viewpoint of simultaneously achieving excellent heat resistance and permeability of a multilayer porous membrane, applying uniformly an inorganic filler-containing resin solution which forms a porous layer described later, and further improving adhesiveness between the porous layer and a polyolefin resin porous membrane.

Here, examples of the heat treatment step may include a corona discharge treatment method, a plasma treatment method, a mechanical surface roughening method, a solvent treatment method, an acid-treatment method, an ultraviolet oxidation method, a hydrophilization treatment method by a surfactant or the like and a crosslinking treatment method with an ionizing radiation ray or the like.

The surface wetting index (measurement method: JIS K-6768) of the polyolefin resin porous membrane is preferably 40 mN/m or more, more preferably 45 mN/m or more, further more preferably 55 mN/m or more, especially preferably 70 mN/m or more, and the upper limit is preferably 476 mN/m or less from the viewpoint of achieving both the heat resistance and permeability.

In addition, for the method of adjusting the surface wetting index of a polyolefin resin porous membrane within the above range, a condition of the surface treatment method may be arbitrarily selected.

The polyolefin resin porous membrane has a porosity of preferably 30% or more, and more preferably 40% or more, and the upper limit is preferably 85% or less, more preferably 70% or less, and further more preferably 55% or less. In addition, a diagonal sample of 100 mm×100 mm is cut off from a polyolefin resin porous membrane to determine the volume ($mm^3$) and mass (mg). The porosity in the present embodiment is a value calculated from the following formula by using the volume, the mass and the membrane density ($g/cm^3$).

$$\text{Porosity} = (\text{volume} - \text{mass}/\text{membrane density})/\text{volume} \times 100$$

In addition, the polyolefin resin porous membrane has a porosity of preferably 10 s/100 cc or more, more preferably 150 s/100 cc or more, and the upper limit is preferably 650 s/100 cc or less and more preferably 400 s/100 cc or less.

Further, the porosity or air permeability may be adjusted by arbitrarily selecting the production condition of the polyolefin resin porous membrane.

[Porous Layer and Multilayer Porous Membrane]

The multilayer of the present embodiment is formed, for example, by using an inorganic filler-containing resin solution (dispersion solution) containing an inorganic filler and a resin binder.

As the inorganic filler, preferable is one which has a melting point of 200° C. or higher, has high electrical insulation properties and is electrochemically stable in the range of using a lithium-ion secondary battery. Examples of the inorganic filler may specifically include oxide-based ceramics such as alumina, silica, titania, zilconia, magnesia, ceria, yttria, zinc oxide and iron oxide; nitride-based ceramics such as silicon nitride, titanium nitride and boron nitride; ceramics such as silicon carbide, calcium carbonate, aluminum sulfate, aluminum hydroxide, potassium titanate, talc, kaolin clay, kaolinite, halocite, pyrophyllite, montmorillonite, selicite, mica, amesite, bentonite, asbestos, zeolite, calcium silicate, magnesium silicate, diatomaceous earth and silica sand; and glass fiber. These may be used alone or in combination with two or more kinds. Among these, alumina and titania are preferable from the viewpoint of electrochemical stability.

The inorganic filler has an average particle diameter of preferably 0.1 μm or more, more preferably 0.2 μm or more, further more preferably 0.3 μm, and the upper limit is preferably 3.0 μm or less and more preferably 1.0 μm or less. It is preferable to adjust the average particle diameter to 0.1 μm or more from the viewpoint of preventing the occurrence of membrane breakage by reducing the thermal shrinkage rate of a multilayer porous membrane and achieving a high short-circuit temperature. On the other hand, it is preferable to adjust the average particle diameter to 3.0 μm or less from the viewpoint of preventing the occurrence of membrane breakage by reducing the thermal shrinkage rate of a multilayer porous membrane. In addition, it is preferable to adjust the average particle diameter to 1.5 μm or less from the viewpoint of favorably forming a porous layer having a small layer thickness and the dispersibility of an inorganic filler in the porous layer.

In addition, the “average particle diameter of an inorganic filler” in the present embodiment is a value measured according to a method using SEM in the measurement method of the embodiment described later.

The ratio (mass fraction) of the inorganic filler in the multilayer layer is preferably 50% or more, more preferably 55% or more, further more preferably 60% or more, especially preferably 65% or more, and the upper layer is preferably less than 100%, preferably 99.99% or less, further more preferably 99.9% or less and especially preferably 99% or less from the viewpoint of achieving the heat resistance.

On the other hand, it is preferable that the resin binder may bond an inorganic filler, is insoluble to an electrolyte of a lithium-ion secondary battery and is electrochemically stable in the range of using a lithium-ion secondary battery.

Examples of the resin binder may include a polyolefin such as polyethylene and polypropylene, a fluorine-containing resin such as polyvinylidene fluoride and polytetrafluoroethylene, a fluorine-containing rubber such as a vinylidene fluoride-hexafluoropropylene-tetrafluoroethylene copolymer and an ethylene-tetrafluoroethylene copolymer, a styrene-butadiene copolymer and its hydride, an acrylonitrile-butadiene copolymer and its hydride, an acrylonitrile-butadiene-styrene copolymer and its hydride, a methacrylic acid ester-acrylic acid ester copolymer, a styrene-acrylic acid ester copolymer, an acrylonitrile-acrylic acid ester copolymer, an ethylene-propylene rubber, polyvinyl alcohol, rubbers such as polyvinyl acetate, and a resin having a melting point and/or glass transition temperature of 180° C. or higher such as polyphenylene ether, polysulfone, polyether sulfone, polyphenylene sulfide, polyether imide, polyamide-imide, polyamide and polyester. These may be used alone or in combination with two or more kinds.

In addition, the polyolefin used for a resin binder has a viscosity average molecular weight of preferably 1000 or more, more preferably 2000 or more, further more preferably 5000 or more, and the upper limit is preferably less than 12000000, more preferably less than 2000000 and further more preferably less than 1000000 from the viewpoint of forming processability.

When a polyvinyl alcohol is used as a resin binder, the polyvinyl alcohol has a degree of saponification of preferably 85% or more and 100% or less. It is preferable to adjust the degree of saponification to 85% or more from the viewpoint of significantly increasing the short-circuit temperature, suppressing the variation in short-circuit temperature and achieving a good stability performance. The polyvinyl alcohol has a degree of saponification of more preferably 90% or more, further more preferably 95% or more, and especially preferably 99% or more.

In addition, the “degree of saponification” in the present embodiment is a value measured according to the measurement method of the example described later.

The polyvinyl alcohol has an average degree of polymerization (measurement method: JIS K-6726) of preferably 200 or more, more preferably 300 or more, further more preferably 500 or more, and the upper limit is preferably 5000 or less, more preferably 4000 or less, and further more preferably 3500 or less. It is preferable to adjust the average degree of polymerization to 200 or more from the viewpoint of capable of tightly bonding an inorganic filler in a small amount and suppressing the increase of air permeability of a multilayer porous membrane while maintaining the mechanical strength of a multilayer. Meanwhile, it is preferable to adjust the average degree of polymerization to 5000 or less from the viewpoint of preventing gelation and the like in case of preparing a dispersion solution with an inorganic filler.

In addition, as the polyvinyl alcohol, a commercially available product may be used, and as the average degree of polymerization, the value described in the catalogue may be used.

The ratio of the resin binder to the total amount of the inorganic filler and the resin binder is preferably 0.5% or more, more preferably 0.7% or more, further more preferably 1.0% or more, especially preferably 2% or more, most preferably 2.5% or more, and the upper limit is preferably 8% or less, in terms of volume fraction, from the viewpoint of the bonding properties of both. It is preferable to adjust the volume fraction to 0.5% or more from the viewpoint of sufficiently bonding an inorganic filler and preventing the occurrence of peeling, defects and the like (sufficiently securing good handling properties). Meanwhile, it is preferable to adjust the volume fraction to 8% or less from the viewpoint of achieving good ion permeability of a separator.

The multilayer has a layer thickness of preferably 0.5 μm or more, more preferably 2 μm or more, further more preferably 3 μm or more, and especially preferably 4 μm or more from the viewpoint of improving the heat resistance. The upper limit is preferably 100 μm or less, more preferably 50 μm or less, further more preferably 30 μm or less, especially preferably 20 μm or less, and most preferably 10 μm or less from the viewpoint of permeability and achieving higher capacity of a battery.

The multilayer porous layer of the present embodiment may be produced by forming a porous multilayer on the surface of a polyolefin resin porous membrane by applying an organic filler-containing resin solution (dispersion solution) in which the inorganic filler and the resin binder are dissolved or dispersed in a solvent on at least one surface of the polyolefin resin porous membrane.

Here, when a dispersion solution containing an inorganic filler and a resin binder is applied on a separator surface which is a porous membrane to form an inorganic filler layer on the separator surface, while this method is excellent in productivity, it sometimes happened that a resin binder for binding an inorganic filler and an inorganic filler entered into fine pores of a separator to occlude many fine pores, thus reducing the permeability of the separator.

However, it has been found that in the present embodiment, the clogging is surprisingly reduced and a good permeability of the separator may be achieved by adjusting the maximum value of the thermal shrinkage force of a separator which is a composition or a substrate of a dispersion solution, or the wetting index of the separator surface in a specific range.

As the solvent, it is preferable to use a solvent which may uniformly and stably dissolve or disperse an inorganic filler and a resin binder. Examples of the solvent may include N-methylpyrrolidone, N,N-dimethylformamide, N,N-dimethylacetamide, water, ethanol, toluene, hot xylene and hexane. In addition, in order to stabilize an inorganic filler-containing resin solution or to improve the coating properties to a polyolefin resin porous membrane, there may be added to the dispersion solution various additives including a dispersant such as a surfactant, a thickener, an wetting agent, an antifoaming agent, and a pH adjusting agent including acid or alkali or the like. As these additives, preferred are ones which may be removed during solvent removal or plasticizer extraction, but may remain in a battery (in a multilayer porous membrane) if they are electrochemically stable in the range of using a lithium-ion secondary battery, do not inhibit a battery reaction and are stable up to 200° C.

As the method for dissolving or dispersing an inorganic filler and a resin binder in a solvent, examples of the method may include a mechanical agitation method by a ball mill, a beads mill, a planetary ball mill, a vibration ball mill, a sand mill, a colloid mill, an attritor, a roll mill, high-speed impeller dispersion, a disperser, a homogenizer, a high speed impact mill, ultrasonic dispersion, an agitation blade, and the like.

As the method of applying the dispersion solution on the surface of a polyolefin resin porous membrane is not particularly limited if it may achieve the layer thickness or the coated area required. Examples of the coating method may include a gravure coater method, a minor diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method and a spray coating method. In addition, the dispersion solution may be applied on one surface or both surfaces of a polyolefin resin porous membrane in light of the application.

As the solvent, preferable is one which may be removed from a dispersion solution applied on a polyolefin resin porous membrane. The method of removing a solvent may be employed without any particular limitations if it does not adversely affect a polyolefin resin porous membrane. Examples of the method of removing a solvent may include a method of drying at a temperature below the melting point while fixing a polyolefin resin porous membrane, a method of drying under reduced pressure at a low temperature, and a method of immersing in a poor solvent for a resin binder to solidify the resin binder and simultaneously to extract the solvent.

In addition, the multilayer porous membrane may be produced by a method different from the above production method. For example, there may be employed a method comprising feeding a raw material of a polyolefin resin porous membrane (for example, a polyolefin resin and a plasticizer) into one extruder and feeding a raw material of a multilayer (an inorganic filler and resin binder, and if needed, a plasticizer) into the other extruder, and then the integrating (coextruding) both materials in a single die to form a sheet-like shape and followed by extracting the plasticizer.

In the multilayer porous membrane, the ratio of the layer thickness of the porous layer to the thickness of the multilayer porous membrane (total layer thickness) is preferably 15% or more, more preferably 16% or more, and the upper limit is preferably 50% or less and more preferably 47% or less. It is preferable to adjust the ratio to 15% or more from the viewpoint of increasing the short-circuit temperature and achieving a good heat resistance. Meanwhile, it is preferable to adjust the ratio to 50% or less from the viewpoint of suppressing the permeability reduction of the separator.

When comparing the air permeability of the polyolefin resin porous membrane with the air permeability of a multilayer porous membrane (after laminating a porous layer), the increasing rate of air permeability is preferably 0% or more, and the upper limit is preferably 100% or less, more preferably 70% or less, and further more preferably 50% or less. The increasing rate of air permeability is used as an index for evaluating the ion permeability (charge and discharge characteristics of a battery) of a multilayer porous membrane.

In addition, when the air permeability of a polyolefin resin porous membrane which is a substrate is less than 100 s/100 cc, even if the increasing rate of air permeability is 0% or more and 500% or less, a multilayer porous membrane may be preferably used as a separator.

The air permeability of a multilayer porous membrane is preferably 10 s/100 cc or more, more preferably 20 s/100 cc or more, further more preferably 30 s/100 cc or more and especially preferably 50 s/100 cc. Meanwhile, the upper limit is preferably 650 s/100 cc or less, more preferably 500 s/100 cc or less, further more preferably 450 s/100 cc or less, and especially preferably 400 s/100 cc. It is preferable to adjust the air permeability of the membrane to 10 s/100 cc or more from the viewpoint of suppressing self-discharge when used as a battery separator. Meanwhile, it is preferable to adjust the air permeability of the membrane to 650 s/100 cc or less from the viewpoint of obtaining good charge and discharge characteristics.

The multilayer porous membrane has a film thickness (total layer thickness) of preferably 2 μm or more, more preferably 5 μm or more, further more preferably 7 μm or more, and the upper limit is preferably 200 μm or less, more preferably 100 μm or less, and further more preferably 50 μm or less. It is preferable to adjust the film thickness to 2 μm or more from the viewpoint of sufficiently securing the mechanical strength. Meanwhile, it is preferable to adjust the film thickness to 200 μm or less from the viewpoint of reducing the volume occupied by a separator and achieving higher capacity of a battery.

The multilayer porous membrane has a thermal shrinkage rate at 150° C. or at 130° C. of preferably 0% or more and 15% or less, more preferably 0% or more and 10% or less, and especially preferably 0% or more and 5% or less. It is preferable to adjust the thermal shrinkage rate to 15% or less from the viewpoint of preferably preventing membrane breakage of a separator even at the time of abnormal heat generation of a battery and suppressing the contact between positive and negative electrodes (achieving more preferable safety performance). In addition, the thermal shrinkage rate is preferably set within the above range in both the MD and TD directions.

The multilayer porous membrane has a shutdown temperature (a temperature at which micropores of a separator are occluded by heat-melting or the like when a battery causes abnormal heat generation) of preferably 120° C. or higher, and the upper limit is preferably 160° C. or lower, and more preferably 150° C. or lower. It is preferable to adjust the shutdown temperature to 160° C. or lower from the viewpoint of rapidly promoting current cutoff and obtaining more preferable safety performance. Meanwhile, it is preferable to adjust the shutdown temperature to 120° C. or higher from the viewpoint of, for example, enablement at a high temperature around 100° C. or capable of performing various heat treatments.

The multilayer porous membrane has a short-circuit temperature of preferably 180° C. or higher, more preferably 200° C. or higher, and the upper limit is preferably 1000° C. or lower. It is preferable to adjust the short-circuit temperature to 180° C. or higher from the viewpoint of suppressing the contact between positive and negative electrodes until heat release occurs even at the time of abnormal heat generation of a battery and achieving more preferable safety performance.

In addition, any of the air permeability, film thickness, thermal shrinkage rate, shutdown temperature and short-circuit temperature of these multilayer porous membranes may be measured according to the measurement methods of the Examples described later.

Since the multilayer porous membrane of the present embodiment is excellent in heat resistance and ion permeability, it is especially useful as a separator used in a non-aqueous electrolyte secondary battery such as a lithium-ion secondary battery or a storage cell such as an electric double layer capacitor. And, the multilayer porous membrane of the present embodiment is used as a separator, thereby enabling to obtain a non-aqueous electrolyte secondary battery with high safety and practicability.

EXAMPLES

Next, the present embodiment will be described in more detail with reference to Examples and Comparative Examples, but the present embodiment is not limited to the following Examples as long as it does not exceed the gist. In addition, the physical properties in Examples were measured by the following methods.

(1) Viscosity Average Molecular Weight (Mv)

The limiting viscosity [η] (dl/g) in decalin at 135° C. is determined based on ASTM-D4020. The Mv of polyethylene was calculated from the following formula.

$$[\eta]=6.77\times10^{-4}\,Mv^{0.67}$$

The Mv of polypropylene was calculated from the following formula.

$$[\eta]=1.10\times10^{-4}\,Mv^{0.80}$$

(2) Film Thickness (μm)

The measurement was made by a dial gauge (PEACOCK No. 25 (trade name), manufactured by Ozaki Mfg. Co., Ltd.). A sample of MD 10 mm×TD 10 mm was cut out from a porous membrane and the film thickness at 9 locations (3 points×3 points) was measured in a lattice pattern. The average value obtained was used as a film thickness (μm).

(3) Air Permeability (s/100 cc)

The measurement was made with a Gurley type air permeability meter (G-B2 (trade name), manufactured by Toyo Seiki Seisaku-Sho Ltd.) according to JIS P-8117. The measurement was made for the time required to pass 100 ml of air through an area of 645 $mm^2$ in an inner cylinder with a weight of 567 g and a diameter of 28.6 mm. The increasing rate of air permeability caused by forming a porous layer is calculated from the following formula.

$$\text{Increasing rate of air permeability}(\%)=\{(\text{Air permeability of porous multilayer membrane}-\text{Air permeability of Polyolefin resin porous membrane})/\text{Air permeability of Polyolefin resin porous membrane}\}\times100$$

(4) Average Particle Diameter of Inorganic Filler (μm)

A visual field of 10 μm×10 μm magnified by a scanning electron microscope (SEM), either directly or after printing from a negative on a photograph, was taken into an image analysis apparatus, from which the number-average value of the circle conversion diameter (diameter of a circle having the same area) of each particle was calculated and used as an average particle diameter (μm) of an inorganic filler. However, when the stained boundary is unclear in inputting the image data to the image analysis apparatus, a tracing of the photograph is made, and the image data was inputted to the image analysis apparatus by using the drawing. Unless otherwise specified in the present embodiment, the "average particle diameter of an inorganic filler" is measured by using a scanning electron microscope (SEM).

In addition, the average particle diameter of an inorganic filler may be measured by using a laser particle size distribution analyzer. In this case, an inorganic filler is added to distilled water and then a small amount of a sodium hexametaphosphate solution is added. The mixture solution is dispersed by an ultrasonic homogenizer for one minute to obtain a dispersion solution. The particle size distribution of the dispersion solution is measured using a laser particle size distribution analyzer (Microtrac MT3300EX, manufactured by Nikkiso Co., Ltd.), and the particle diameter that corresponds to a cumulative frequency of 50% may be used as an average particle diameter of the inorganic filler. In addition, when the average particle diameter of an inorganic filler is measured using a laser particle size distribution analyzer in the present embodiment, it is described accordingly.

(5) Bulk Density ($g/cm^3$) of Inorganic Filler

The tamped bulk density was measured according to JIS R-9301-2-3.

(6) Volume Fraction (%) of Resin Binder

The volume fraction (%) of a resin binder was calculated from the following formula.

$$Vb=\{(Wb/Db)/(Wb/Db+Wf/Df)\}\times100$$

Vb: The volume fraction (%) of a resin binder

Wb: The weight (g) of a resin binder

Wf: The weight (g) of an inorganic filler

Db: The density ($g/cm^3$) of a resin binder

Df: The bulk density ($g/cm^3$) of an inorganic filler (7) Degree of Saponification (%) of PVA The measurement was made according to JIS K-0070.

(8) MD Maximum Thermal Shrinkage Force (g) and TD Maximum Thermal Shrinkage Force (g)

The measurement was made using TMA50 (trade mark) manufactured by Shimadzu Corporation. When a value in the MD (TD) direction is measured, a sample cut out to a width of 3 mm in the TD (MD) direction is fixed on a chuck so that the distance between the chucks is 10 mm and set in a dedicated probe. The initial load was set to 1.0 g and the probe was heated from 30° C. to 200° C. at a temperature increasing rate of 10° C./min, during which the load (g) generated was measured, and the maximum value was used as an MD(TD) maximum thermal shrinkage force (g).

(9) Thermal Shrinkage Rate at 150° C. and Thermal Shrinkage Rate at 130° C.

A separator is cut off to a length of 100 mm in the MD direction and to a length of 100 mm in the TD direction and allowed to stand in an oven at a predetermined temperature (150° C. or 130° C.) for one hour. At this time, the samples are clipped with two sheets of paper so that warm air is not directly applied to the samples. After the samples were taken out from the oven, the length (mm) of the samples was measured and the thermal shrinkage rates of MD and TD were calculated from the following formula.

$$MD \text{ thermal shrinkage rate}(\%)=\{(100-\text{The length of MD after heating})/100\}\times 100$$

$$TD \text{ thermal shrinkage rate}(\%)=\{(100-\text{The length of TD after heating})/100\}\times 100$$

(10) Wetting Index (mN/m)

The measurement was made by a method according to JIS K-6768.

(11) Shutdown Temperature and Short-Circuit Temperature a. Preparation of Positive Electrode A slurry is prepared by dispersing 92.2% by mass of a lithium-cobalt composite oxide ($LiCoO_2$) as a positive electrode active material, 2.3% by mass each of scale-like graphite and acetylene black as a conductive material, and 3.2% by mass of polyvinylidene fluoride (PVDF) as a binder in N-methylpyrrolidone (NMP). The slurry is coated on one surface of an aluminum foil with a thickness of 20 μm as a positive electrode collector by a die coater and dried at 130° C. for 3 minutes, followed by compression molding by a roll press machine. At this time, the coating is adjusted so that the coating amount of the positive electrode active material is 250 g/m and the bulk density of the active material is 3.00 g/cm$^3$.

b. Preparation of Negative Electrode

A slurry is prepared by dispersing 96.6% by mass of artificial graphite as a negative electrode active material, 1.4% by mass of ammonium salt of carboxymethyl cellulose and 1.7% by mass of a styrene-butadiene copolymer latex as a binder in purified water. The slurry is coated on one surface of a copper foil with a thickness of 12 μm as a negative electrode collector by a die coater and dried at 120° C. for 3 minutes, followed by compression molding by a roll press machine. At this time, the coating is adjusted so that the coating amount of the negative electrode active material is 106 g/m$^2$ and the bulk density of the active material is 1.35 g/cm$^3$.

c. Non-Aqueous Electrolyte

The non-aqueous electrolyte is prepared by dissolving $LiBF_4$ as a solute in a mixture solvent of propylene carbonate, ethylene carbonate and γ-butyllactone mixed in a volume ratio of 1:1:2.

d. Evaluation

On a ceramics plate connecting to a thermocouple is placed a negative electrode which is cut out to 65 mm×20 mm and immersed in a non-aqueous electrolyte for one minute or longer, on the negative electrode is placed an aramid film with a thickness of 9 μm which is cut out to 50 mm×50 mm and in which a hole with a diameter of 16 mm is produced in the center part, on the aramid film is placed a porous membrane which is cut out to 40 mm×40 mm and immersed in a non-aqueous electrolyte for one hour or longer to cover the hole part of the aramid film, on the porous membrane is placed a positive electrode which is cut out to 65 mm×20 mm and immersed in a non-aqueous electrolyte for one minute or longer so as not to contact with the negative electrode, and on the positive electrode are placed a Kapton film and further a silicon rubber with a thickness of approximately 4 mm.

The resulting product is set on a hot plate and then heated at a rate of 15° C./min while applying a pressure of 4.1 MPa with a hydraulic press machine, during which an impedance change between the positive and negative electrodes was measured under the conditions of an alternating current of 1 kHz 1 V up to 200° C. In this measurement, a temperature where the impedance reached 1000 ohms was defined as a shutdown temperature, and after reaching the pore occlusion condition, a temperature where the impedance again fell below 1000 ohms was defined as a short-circuit temperature.

(12) Battery Evaluation a. Preparation of Positive Electrode

The positive electrode prepared in a. in (11) was punched out into a circle with an area of 2.00 cm$^2$.

b. Preparation of Negative Electrode

The negative electrode prepared in b. in (11) was punched out into a circle with an area of 2.05 cm$^2$.

c. Non-Aqueous Electrolyte

The non-aqueous electrolyte is prepared by dissolving $LiBF_6$ as a solute in a mixture solvent of ethylene carbonate and ethylmethyl carbonate mixed in a volume ratio of 1:2.

d. Battery Assembly and Evaluation

The negative electrode, the separator and the positive electrode are overlapped in this order from below so that the active material surfaces of the positive and negative electrodes face each other, and are accommodated in a stainless metal container with cap. The container and the cap are insulated, and the container is contacted with the copper foil of the negative electrode and the cap is contacted with the aluminum foil of the positive electrode. The non-aqueous electrolyte is injected and sealed in the container.

The simple battery fabricated as described above is initially charged for approximately 6 hours in total after the preparation of the battery by a method which comprises charging the battery to a battery voltage of 4.2 V at a current value of 3 mA (approximately 0.5 C) under the atmosphere of 25° C. and further starting to lower the current value from 3 mA so as to maintain the voltage at 4.2 V, and thereafter the battery is discharged to a battery voltage of 3.0 V at a current value of 3 mA.

Subsequently, the battery is charged for approximately 3 hours in total by a method which comprises charging the battery to a battery voltage of 4.2 V at a current value of 6 mA (approximately 1.0 C) under the atmosphere of 25° C. and further starting to lower the current value from 6 mA so as to maintain the voltage at 4.2 V, and thereafter the battery is discharged to a battery voltage of 3.0 V at a current value of 6 mA. The discharge capacity at that time was defined as 1 C discharge capacity (mAh).

Next, the battery is charged for approximately 3 hours in total by a method which comprises charging the battery to a battery voltage of 4.2 V at a current value of 6 mA (approximately 1.0 C) under the atmosphere of 25° C. and further starting to lower the current value from 6 mA so as to maintain the voltage at 4.2 V, and thereafter the battery is discharged to a battery voltage of 3.0 V at a current value of 12 mA (approximately 2.0 C). The discharge capacity at that time was defined as 2 C discharge capacity (mAh).

The ratio of the 2 C discharge capacity to the 1 C discharge capacity was calculated and the value was defined as a rate property.

$$\text{Rate Property}=2C \text{ Discharge Capacity}/1C \text{ Discharge Capacity}\times 100$$

In addition, a cycle was repeated in which the battery is charged for approximately 3 hours in total by a method which comprises charging the battery to a battery voltage of 4.2 V at a current value of 6 mA (approximately 1.0 C) under the atmosphere of 60° C. and further starting to lower the current value from 6 mA so as to maintain the voltage at 4.2 V, and thereafter the battery is discharged to a battery voltage of 3.0 V at a current value of 6 mA.

The ratio of the discharge capacity after a predetermined cycle to the discharge capacity at the first cycle in the cycles was determined as a capacity maintenance rate (%) to judge the cycle property.

Example 1

A mixture was prepared by adding 16.6 parts by mass of polyethylene having a viscosity average molecular weight (Mv) of 700000, 16.6 parts by mass of polyethylene having an Mv of 250000, 1.8 parts by mass of polypropylene having an Mv of 400000, 40 parts by mass of liquid paraffin (LP) as a plasticizer and 0.3 parts by mass of pentaerythrityl-tetrakis-[3-(3,5-di-t-butyl-4-hydroxyphenyl)propionate] as an antioxidant, and the mixture was preliminarily blended by a Henschel mixer. The resulting mixture was fed into the feed inlet of a simultaneous co-rotating twin-screw extruder by a feeder. In addition, liquid paraffin was side fed into a twin-screw extruder cylinder so that the ratio of the amount of the liquid paraffin to the amount of the total mixture (100 parts by mass) to be melted and kneaded and extruded is 65 parts by mass. The melting and kneading was carried out under the conditions of a setting temperature of 200° C., a screw rotation number of 240 rpm and a discharging amount of 12 kg/h. Subsequently, the melted and kneaded product was extruded through a T-die into between cold rollers controlled so as to have a surface temperature of 25° C., thereby obtaining a sheet-like polyolefin composition having a thickness of 1300 μm. Thereafter, the polyolefin composition was continuously introduced into a tenter simultaneous biaxial stretching machine and was simultaneously biaxially stretched to 7 times in the MD direction and to 6.4 times in the TD direction. At that time, the setting temperature of the simultaneous biaxial tenter was 120° C. Next, the resulting product was introduced into a methyl ethyl ketone bath to remove the plasticizer, followed by drying to remove methyl ethyl ketone. Further, the resulting product was introduced into a TD tenter heat fixation machine to thermally fix. The heat fixation temperature was set at 125° C. and the TD relaxation rate was set at 0.80. As a result, there was obtained a polyolefin resin porous membrane having a film thickness of 16 μm, a porosity of 46% and an air permeability of 190 s/100 cc.

The surface of the polyolefin resin porous membrane was subjected to corona discharge treatment (the discharge amount: 50 W). A solution was prepared by uniformly dispersing each of 96 parts by mass of alumina particles (the average particle diameter: 0.20 μm, the bulk density: 1.3 g/cm$^3$), 8 parts by mass of an SB latex (the density of the resin: 0.93 g/cm$^3$, the solids concentration: 50%, the minimum film forming temperature: 0° C. or lower), 1 part by mass of an ammonium polycarboxylate solution (SN-Dispersant 5468, produced by San Nopco Limited) and 1 part by mass of a polyoxyalkylene-based surfactant (SN-Wet 980, produced by San Nopco Limited) in 150 parts by mass of water. Thereafter, the solution was applied on the treated surface of the polyolefin resin porous membrane by using a bar coater. Subsequently, the resulting membrane was dried at 60° C. to remove water to obtain a multilayer porous membrane having a total film thickness of 20 μm in which a porous layer with a thickness of 4 μm was formed on the porous membrane. As the composition ratio between the inorganic filler and the resin binder in the porous layer, the resin binder had a volume fraction of 5.5%. In addition, the ratio of the layer thickness of the porous layer to the total layer thickness of the multilayer porous membrane was 20%.

The resulting multilayer porous membrane maintained excellent permeability because it had an air permeability of 210 s/100 cc and the increasing rate of the air permeability caused by forming a porous layer was 11%, which is low. In addition, the multilayer porous membrane showed extremely high heat resistance because the MD thermal shrinkage rate at 130° C. was 10%, the TD thermal shrinkage rate at 130° C. was 6%, which are low, and the shutdown temperature was observed at 148° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 2

A solution was prepared by uniformly dispersing each of 96 parts by mass of alumina particles (the average particle diameter: 0.70 μm, the bulk density: 0.9 g/cm$^3$) and 4 parts by mass of a polyvinyl alcohol (the density of the resin: 1.28 g/cm$^3$, the average degree of polymerization: 1700, the degree of saponification: 99% or more) in 150 parts by mass of water. The solution was applied on the surface of the polyolefin resin porous membrane used for a substrate in Example 1 by using a gravure coater. Thereafter, the resulting membrane was dried at 60° C. to remove water to obtain a multilayer porous membrane having a total film thickness of 23 μm in which a porous layer with a thickness of 7 μm was formed on the porous membrane. As the composition ratio between the inorganic filler and the resin binder in the porous layer, the resin binder had a volume fraction of 2.8%. In addition, the ratio of the layer thickness of the porous layer to the total layer thickness of the multilayer porous membrane was 30%.

The resulting multilayer porous membrane maintained excellent permeability because it had an air permeability of 265 s/100 cc and the increasing rate of the air permeability caused by forming a porous layer was 39%, which is low. In addition, the multilayer porous membrane showed extremely high heat resistance because the MD thermal shrinkage rate at 130° C. was 4%, the TD thermal shrinkage rate at 130° C. was 3%, which are low, and the shutdown temperature was observed at 143° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more,

Example 3

There was obtained a multilayer porous membrane having a total film thickness of 20 μm in which a porous layer with a thickness of 4 μm was formed on the porous membrane in the same manner as in Example 1 except that in Example 1, the alumina particles were changed to those having an average particle diameter of 0.70 μm and a bulk density of 0.9 g/cm$^3$. As the composition ratio between the inorganic filler and the resin binder in the porous layer, the resin binder had a volume fraction of 3.9%. In addition, the ratio of the layer thickness of the porous layer to the total layer thickness of the multilayer porous membrane was 20%.

The resulting multilayer porous membrane maintained excellent permeability because it had an air permeability of 215 s/100 cc and the increasing rate of the air permeability caused by forming a porous layer was 13%, which is low. In addition, the multilayer porous membrane showed extremely high heat resistance because the MD thermal shrinkage rate at 130° C. was 9%, the TD thermal shrinkage rate at 130° C. was 6%, which are low, and the shutdown temperature was observed at 140° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 4

There was obtained a multilayer porous membrane having a total film thickness of 19 μm in which a porous layer with a thickness of 3 μm was formed on the porous membrane in the same manner as in Example 3 except that in Example 3, the dispersed amount of the alumina particles was changed to 95 parts by mass and the solid content of the SD latex was changed to 5 parts by mass. As the composition ratio between the inorganic filler and the resin binder in the porous layer, the resin binder had a volume fraction of 4.8%. In addition, the ratio of the layer thickness of the porous layer to the total layer thickness of the multilayer porous membrane was 16%.

The resulting multilayer porous membrane maintained excellent permeability because it had an air permeability of 205 s/100 cc and the increasing rate of the air permeability caused by forming a porous layer was 8%, which is low. In addition, the multilayer porous membrane showed extremely high heat resistance because the MD thermal shrinkage rate at 130° C. was 7%, the TD thermal shrinkage rate at 130° C. was 6%, which are low, and the shutdown temperature was observed at 142° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 5

There was obtained a multilayer porous membrane having a total film thickness of 23 μm in the same manner as in Example 4 except that in Example 4, the thickness of the porous layer was changed to 7 As the composition ratio between the inorganic filler and the resin binder in the porous layer, the resin binder had a volume fraction of 4.8%. In addition, the ratio of the layer thickness of the porous layer to the total layer thickness of the multilayer porous membrane was 30%.

The resulting multilayer porous membrane maintained excellent permeability because it had an air permeability of 240 s/100 cc and the increasing rate of the air permeability caused by forming a porous layer was 26%, which is low. In addition, the multilayer porous membrane showed extremely high heat resistance because the MD thermal shrinkage rate at 130° C. was 5%, the TD thermal shrinkage rate at 130° C. was 4%, which are low, and the shutdown temperature was observed at 143° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 6

There was obtained a multilayer porous membrane having a total film thickness of 21 μm in which a porous layer with a thickness of 5 μm was formed on the porous membrane in the same manner as in Example 1 except that in Example 1, the alumina particles were changed to those having an average particle diameter of 0.61 μm and a bulk density of 1.5 g/cm$^3$. As the composition ratio between the inorganic filler and the resin binder in the porous layer, the resin binder had a volume fraction of 6.3%. In addition, the ratio of the layer thickness of the porous layer to the total layer thickness of the multilayer porous membrane was 24%.

The resulting multilayer porous membrane maintained excellent permeability because it had an air permeability of 220 s/100 cc and the increasing rate of the air permeability caused by forming a porous layer was 16%, which is low. In addition, the multilayer porous membrane showed extremely high heat resistance because the MD thermal shrinkage rate at 130° C. was 10%, the TD thermal shrinkage rate at 130° C. was 8%, which are low, and the shutdown temperature was observed at 150° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 7

There was obtained a multilayer porous membrane having a total film thickness of 21 μm in which a porous layer with a thickness of 5 μm was formed on the porous membrane in the same manner as in Example 6 except that in Example 6, the dispersed amount of the alumina particles was changed to 95 parts by mass and the solid content of the SD latex was changed to 5 parts by mass. As the composition ratio between the inorganic filler and the resin binder in the porous layer, the resin binder had a volume fraction of 7.8%. In addition, the ratio of the layer thickness of the porous layer to the total layer thickness of the multilayer porous membrane was 24%.

The resulting multilayer porous membrane maintained excellent permeability because it had an air permeability of 225 s/100 cc and the increasing rate of the air permeability caused by forming a porous layer was 18%, which is low. In addition, the multilayer porous membrane showed extremely high heat resistance because the MD thermal shrinkage rate at 130° C. was 10%, the TD thermal shrinkage rate at 130° C. was 5%, which are low, and the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 8

There was obtained a multilayer porous membrane having a total film thickness of 30 μm in the same manner as in Example 7 except that in Example 7, the thickness of the porous layer was changed to 14 μm. As the composition ratio between the inorganic filler and the resin binder in the porous layer, the resin binder had a volume fraction of 7.8%. In addition, the ratio of the layer thickness of the porous layer to the total layer thickness of the multilayer porous membrane was 47%.

The resulting multilayer porous membrane maintained excellent permeability because it had an air permeability of 270 s/100 cc and the increasing rate of the air permeability caused by forming a porous layer was 42%, which is low. In addition, the multilayer porous membrane showed extremely high heat resistance because the MD thermal shrinkage rate at 130° C. was 3%, the TD thermal shrinkage rate at 130° C. was 2%, which are low, and the shutdown temperature was observed at 144° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 9

There was obtained a multilayer porous membrane having a total film thickness of 21 μm in which a porous layer with a thickness of 5 μm was formed on the porous membrane in the same manner as in Example 1 except that in Example 1, the alumina particles were changed to those having an average particle diameter of 1.0 μm and a bulk density of 1.2 g/cm$^3$, the dispersed amount of the alumina particles was changed to 94 parts by mass and the solid content of the SB latex was changed 6 parts by mass. As the composition ratio between the inorganic filler and the resin binder in the porous layer, the resin binder had a volume fraction of 7.6%. In addition, the ratio of the layer thickness of the porous layer to the total layer thickness of the multilayer porous membrane was 24%.

The resulting multilayer porous membrane maintained excellent permeability because it had an air permeability of 220 s/100 cc and the increasing rate of the air permeability caused by forming a porous layer was 16%, which is low. In addition, the multilayer porous membrane showed extremely high heat resistance because the MD thermal shrinkage rate at 130° C. was 9%, the TD thermal shrinkage rate at 130° C. was 5%, which are low, and the shutdown temperature was observed at 147° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 10

A solution was prepared by uniformly dispersing each of 97 parts by mass of titania particles (the average particle diameter: 040 μm, the bulk density: 1.2 g/cm$^3$) and 3 parts by mass of a polyvinyl alcohol (the density of the resin: 1.28 g/cm$^3$, the average degree of polymerization: 1700, the degree of saponification: 99% or more) in 150 parts by mass of water. The solution was applied on the surface of a polyolefin resin porous membrane having a film thickness of 16 μm, a porosity of 48% and an air permeability of 165 s/100 cc by using a gravure coater. Thereafter, the resulting membrane was dried at 60° C. to remove water to obtain a multilayer porous membrane having a total film thickness of 21 μm in which a porous layer with a thickness of 5 μm was formed on the porous membrane. As the composition ratio between the inorganic filler and the resin binder in the porous layer, the resin binder had a volume fraction of 2.8%. In addition, the ratio of the layer thickness of the porous layer to the total layer thickness of the multilayer porous membrane was 24%.

The resulting multilayer porous membrane maintained excellent permeability because it had an air permeability of 190 s/100 cc and the increasing rate of the air permeability caused by forming a porous layer was 15%, which is low. In addition, the multilayer porous membrane showed extremely high heat resistance because the MD thermal shrinkage rate at 130° C. was 8%, the TD thermal shrinkage rate at 130° C. was 4%, which are low, and the shutdown temperature was observed at 142° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 11

There was obtained a multilayer porous membrane having a total film thickness of 19 μm in which a porous layer with a thickness of 3 μm was formed on the porous membrane in the same manner as in Example 10 except that in Example 10, the dispersed amount of the titania particles and the polyvinyl alcohol was changed to 95 and 5 parts by mass, respectively. As the composition ratio between the inorganic filler and the resin binder in the porous layer, the resin binder had a volume fraction of 4.7% In addition, the ratio of the layer thickness of the porous layer to the total layer thickness of the multilayer porous membrane was 16%.

The resulting multilayer porous membrane maintained excellent permeability because it had an air permeability of 180 s/100 cc and the increasing rate of the air permeability caused by forming a porous layer was 9%, which is low. In addition, the multilayer porous membrane showed extremely high heat resistance because the MD thermal shrinkage rate at 130° C. was 10%, the TD thermal shrinkage rate at 130° C. was 6%, which are low, and the shutdown temperature was observed at 145° C. and short-circuit was not observed even at 200° C. or higher. According to the battery evaluation performed by using the multilayer porous membrane as a separator, it was found that the rate property was 90% or more, which is high, and the cycle property was excellent because the capacity maintenance rate after 100 cycles was 90% or more.

Example 12

There was obtained a multilayer porous membrane having a total film thickness of 22 μm the same manner as in Example 11 except that in Example 11, the thickness of the porous layer was changed to 6 μm. As the composition ratio between the inorganic filler and the resin binder in the porous layer, the resin binder had a volume fraction of 4.7%. In addition, the ratio of the layer thickness of the porous layer to the total layer thickness of the multilayer porous membrane was 27%.

The resulting multilayer porous membrane maintained excellent permeability because it had an air permeability of 200 s/100 cc and the increasing rate of the air permeability caused by forming a porous layer was 21%, which is low. In addition, the multilayer porous membrane showed extremely high heat resistance because the MD thermal shrinkage rate at 130° C. was 8%, the TD thermal shrinkage rate at 130° C. was 4%, which are low, and the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 13

There was obtained a multilayer porous membrane having a total film thickness of 22 μm in the same manner as in Example 12 except that in Example 12, the polyolefin porous membrane of a substrate was changed to a polyolefin resin porous membrane having a film thickness of 20 μm and porosity of 40% and an air permeability of 280 s/100 cc. As the composition ratio between the inorganic filler and the resin binder in the porous layer, the resin binder had a volume fraction of 4.7%. In addition, the ratio of the layer thickness of the porous layer to the total layer thickness of the multilayer porous membrane was 23%.

The resulting multilayer porous membrane maintained excellent permeability because it had an air permeability of 320 s/100 cc and the increasing rate of the air permeability caused by forming a porous layer was 14%, which is low. In addition, the multilayer porous membrane showed extremely high heat resistance because the MD thermal shrinkage rate at 130° C. was 4%, the TD thermal shrinkage rate at 130° C. was 2%, which are low, and the shutdown temperature was observed at 148° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 14

There was obtained a multilayer porous membrane having a total film thickness of 23 μm in which a porous layer with a thickness of 7 μm was formed on the porous membrane in the same manner as in Example 12 except that in Example 12, the polyolefin porous membrane of a substrate was changed to a polyolefin resin porous membrane having a film thickness of 16 μm and porosity of 45% and an air permeability of 235 s/100 cc. As the composition ratio between the inorganic filler and the resin binder in the porous layer, the resin binder had a volume fraction of 4.7%, In addition, the ratio of the layer thickness of the porous layer to the total layer thickness of the multilayer porous membrane was 30%.

The resulting multilayer porous membrane maintained excellent permeability because it had an air permeability of 285 s/100 cc and the increasing rate of the air permeability caused by forming a porous layer was 21%, which is low. In addition, the multilayer porous membrane showed extremely high heat resistance because the MD thermal shrinkage rate at 130° C. was 3%, the TD thermal shrinkage rate at 130° C. was 1%, which are low, and the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 15

There was obtained a multilayer porous membrane having a total film thickness of 24 μm in the same manner as in Example 11 except that in Example 11, the thickness of the porous layer was changed to 8 μm. As the composition ratio between the inorganic filler and the resin binder in the porous layer, the resin binder had a volume fraction of 4.7%, In addition, the ratio of the layer thickness of the porous layer to the total layer thickness of the multilayer porous membrane was 33%.

The resulting multilayer porous membrane maintained excellent permeability because it had an air permeability of 240 s/100 cc and the increasing rate of the air permeability caused by forming a porous layer was 45%, which is low. In addition, the multilayer porous membrane showed extremely high heat resistance because the MD thermal shrinkage rate at 130° C. was 3%, the TO thermal shrinkage rate at 130° C. was 3%, which are low, and the shutdown temperature was observed at 147° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 16

The surface of the polyolefin resin porous membrane used for a substrate in Example 10 was subjected to corona discharge treatment (the discharge amount: 50 W). A solution was prepared by uniformly dispersing each of 95 parts by mass of titanic particles (the average particle diameter: 0.40 μm, the bulk density: 1.2 g/cm$^3$), 10 parts by mass of an SB latex (the density of the resin: 0.93 g/cm$^3$, the solids concentration: 50%, the minimum film forming temperature: 0° C. or lower), 0.5 parts by mass of concentrated ammonia water and 0.5 parts by mass of a polyoxyalkylene-based surfactant (SN-Wet 980, produced by San Nopco Limited) in 150 parts by mass of water. Thereafter, the solution was applied on the treated surface of the polyolefin resin porous membrane by using a bar coater. Subsequently, the resulting membrane was dried at 60° C. to remove water to obtain a multilayer porous membrane having a total film thickness of 24 μn in which a porous layer with a thickness of 8 μm was formed on the porous membrane. As the composition ratio between the inorganic filler and the resin binder in the porous layer, the resin binder had a volume fraction of 6.4%. In addition, the ratio of the layer thickness of the porous layer to the total layer thickness of the multilayer porous membrane was 33%

The resulting multilayer porous membrane maintained excellent permeability because it had an air permeability of 180 s/100 cc and the increasing rate of the air permeability caused by forming a porous layer was 9%, which is low. In addition, the multilayer porous membrane showed extremely high heat resistance because the MD thermal shrinkage rate at 130° C. was 10%, the TD thermal shrinkage rate at 130° C.

was 6%, which are low, and the shutdown temperature was observed at 149° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more, Example 17

There was obtained a multilayer porous membrane having a total film thickness of 20 μm in which a porous layer with a thickness of 4 μm was formed on the porous membrane in the same manner as in Example 16 except that in Example 16, the dispersed amount of the titanic particles was changed to 94 parts by mass and the solid content of the SB latex was changed to 6 parts by mass. As the composition ratio between the inorganic filler and the resin binder in the porous layer, the resin binder had a volume fraction of 7.4% 7.6%. In addition, the ratio of the layer thickness of the porous layer to the total layer thickness of the multilayer porous membrane was 20%.

The resulting multilayer porous membrane maintained excellent permeability because it had an air permeability of 175 s/100 cc and the increasing rate of the air permeability caused by forming a porous layer was 6%, which is low. In addition, the multilayer porous membrane showed extremely high heat resistance because the MD thermal shrinkage rate at 130° C. was 10%, the TD thermal shrinkage rate at 130° C. was 7%, which are low, and the shutdown temperature was observed at 145° C. and short-circuit was not observed even at 200° C. or higher. According to the battery evaluation performed by using the multilayer porous membrane as a separator, it was found that the rate property was 90% or more, which is high, and the cycle property was excellent because the capacity maintenance rate after 100 cycles was 90% or more.

Example 18

There was obtained a multilayer porous membrane having a total film thickness of 21 μm in which a porous layer with a thickness of 5 μm was formed on the porous membrane in the same manner as in Example 2 except that in Example 2, the alumina particles were changed to those having an average particle diameter of 0.51 μm (an average particle diameter of 0.61 μm as measured by a laser particle size distribution analyzer) and a bulk density of 1.2 g/cm$^3$, and the dispersed amount of the alumina particles and the polyvinyl alcohol was changed to 98.2 and 1.8 parts by mass, respectively. As the composition ratio between the inorganic filler and the resin binder in the porous layer, the resin binder had a volume fraction of 1.7%. In addition, the ratio of the layer thickness of the porous layer to the total layer thickness of the multilayer porous membrane was 24%.

The resulting multilayer porous membrane maintained excellent permeability because it had an air permeability of 205 s/100 cc and the increasing rate of the air permeability caused by forming a porous layer was 8%, which is low. In addition, the multilayer porous membrane showed extremely high heat resistance because the MD thermal shrinkage rate at 130° C. was 2%, the TD thermal shrinkage rate at 130° C. was 1%, which are low, and the shutdown temperature was observed at 143° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 19

There was obtained a multilayer porous membrane having a total film thickness of 22 μm in which a porous layer with a thickness of 6 μm was formed on the porous membrane in the same manner as in Example 2 except that in Example 2, the alumina particles were changed to those having an average particle diameter of 0.85 μm (an average particle diameter of 1.2 μm as measured by a laser particle size distribution analyzer) and a bulk density of 1.2 g/cm$^3$, and the dispersed amount of the alumina particles and the polyvinyl alcohol was changed to 98.6 and 1.4 parts by mass, respectively. As the composition ratio between the inorganic filler and the resin binder in the porous layer, the resin binder had a volume fraction of 1.3%. In addition, the ratio of the layer thickness of the porous layer to the total layer thickness of the multilayer porous membrane was 27%.

The resulting multilayer porous membrane maintained excellent permeability because it had an air permeability of 210 s/100 cc and the increasing rate of the air permeability caused by forming a porous layer was 11%, which is low. In addition, the multilayer porous membrane showed extremely high heat resistance because the MD thermal shrinkage rate at 130° C. was 2%, the TD thermal shrinkage rate at 130° C. was 1%, which are low, and the shutdown temperature was observed at 143° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 20

There was obtained a multilayer porous membrane having a total film thickness of 22 μm in which a porous layer with a thickness of 6 μm was formed on the porous membrane in the same manner as in Example 2 except that in Example 2, the alumina particles were changed to those having an average particle diameter of 1.5 μm (an average particle diameter of 2.3 μm as measured by a laser particle size distribution analyzer) and a bulk density of 1.4 g/cm$^3$, and the dispersed amount of the alumina particles and the polyvinyl alcohol was changed to 98.2 and 1.8 parts by mass, respectively. As the composition ratio between the inorganic filler and the resin binder in the porous layer, the resin binder had a volume fraction of 2.0%. In addition, the ratio of the layer thickness of the porous layer to the total layer thickness of the multilayer porous membrane was 27%.

The resulting multilayer porous membrane maintained excellent permeability because it had an air permeability of 240 s/100 cc and the increasing rate of the air permeability caused by forming a porous layer was 26%, which is low. In addition, the multilayer porous membrane showed extremely high heat resistance because the MD thermal shrinkage rate at 130° C. was 3%, the TD thermal shrinkage rate at 130° C. was 1%, which are low, and the shutdown temperature was observed at 144° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 21

There was obtained a multilayer porous membrane having a total film thickness of 23 μm in which a porous layer with a thickness of 7 μm was formed on the porous membrane in the same manner as in Example 2 except that in Example 2, the dispersed amount of the alumina particles and the polyvinyl alcohol was changed to 99.3 and 0.7 parts by mass, respectively. As the composition ratio between the inorganic filler and the resin binder in the porous layer, the resin binder had a volume fraction of 0.5%. In addition, the ratio of the layer thickness of the porous layer to the total layer thickness of the multilayer porous membrane was 30%.

The resulting multilayer porous membrane maintained excellent permeability because it had an air permeability of 200 s/100 cc and the increasing rate of the air permeability caused by forming a porous layer was 5%, which is low. In addition, the multilayer porous membrane showed extremely high heat resistance because the MD thermal shrinkage rate at 130° C. was 10%, the TD thermal shrinkage rate at 130° C. was 5%, which are low, and the shutdown temperature was observed at 144° C. and short-circuit was not observed even at 200° C. or higher. However, when the membrane was handled, a small amount of peeling was found.

According to the battery evaluation performed by using the multilayer porous membrane as a separator, it was found that the rate property was 90% or more, which is high, and the cycle property was excellent because the capacity maintenance rate after 100 cycles was 90% or more.

Example 22

There was obtained a multilayer porous membrane having a total film thickness of 31 μm in which a porous layer with a thickness of 15 μm was formed on the porous membrane in the same manner as in Example 18 except that in Example 18, the dispersed amount of the alumina particles and the polyvinyl alcohol was changed to 98.8 and 1.2 parts by mass, respectively. As the composition ratio between the inorganic filler and the resin binder in the porous layer, the resin binder had a volume fraction of 1.1%. In addition, the ratio of the layer thickness of the porous layer to the total layer thickness of the multilayer porous membrane was 48%.

The resulting multilayer porous membrane maintained excellent permeability because it had an air permeability of 240 s/100 cc and the increasing rate of the air permeability caused by forming a porous layer was 26%, which is low. In addition, the multilayer porous membrane showed extremely high heat resistance because the MD thermal shrinkage rate at 130° C. was 2%, the TD thermal shrinkage rate at 130° C. was 1%, which are low, and the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 23

A mixture was prepared by adding 24 parts by mass of polyethylene having a viscosity average molecular weight (Mv) of 270000, 16 parts by mass of polyethylene having an Mv of 2000000, 10 parts by mass of silica hydrophobic-treated treated with dimethyldichlorosilane having an average primary particle diameter of 15 nm, 20 parts by mass of liquid paraffin (LP) as a plasticizer and 0.3 parts by mass of pentaerythrityl-tetrakis-[3-(3,5-di-t-butyl-4-hydroxyphenyl) propionate] as an antioxidant, and the mixture was preliminarily blended by a Henschel mixer. The resulting mixture was fed into the feed inlet of a simultaneous co-rotating twin-screw extruder. In addition, liquid paraffin was side fed into a twin-screw extruder cylinder so that the ratio of the amount of the liquid paraffin to the amount of the total mixture (100 parts by mass) to be melted and kneaded and extruded is 50 parts by mass. The melting and kneading was carried out under the conditions of a setting temperature of 200° C., a screw rotation number of 180 rpm and a discharging amount of 12 kg/h. Subsequently, the melted and kneaded product was extruded through a T-die into between cold rollers controlled so as to have a surface temperature of 25° C., thereby obtaining a sheet-like polyolefin composition having a thickness of 1200 μm. Thereafter, the polyolefin composition was continuously introduced into a simultaneous biaxial tenter stretching machine and was simultaneously biaxially stretched to 7 times in the MD direction and to 7 times in the TD direction. At that time, the setting temperature of the simultaneous biaxial tenter was 123° C. Next, the resulting product was introduced into a methyl ethyl ketone bath to remove the plasticizer, followed by drying to remove methyl ethyl ketone. Further, the resulting product was introduced into a TD tenter heat fixation machine to thermally fix. The heat fixation temperature was set at 130° C. and the TD relaxation rate was set at 0.85. As a result, there was obtained a polyolefin resin porous membrane having a film thickness of 19 μl, a porosity of 56% and an air permeability of 150 s/100 cc.

The surface of the polyolefin resin porous membrane was subjected to corona discharge treatment (the discharge amount: 50 W). A solution was prepared by uniformly dispersing each of 98.4 parts by mass of alumina particles (the average particle diameter of 0.85 μm (the average particle diameter of 1.2 μm as measured by a laser particle size distribution analyzer), the bulk density: 1.2 g/cm$^3$) and 1.6 parts by mass of a polyvinyl alcohol (the density of the resin: 1.28 g/cm$^3$, the average degree of polymerization: 1700, the degree of saponification: 99% or more) in 150 parts by mass of water. Thereafter, the solution was applied on the treated surface of the polyolefin resin porous membrane by using a bar coater. Subsequently, the resulting membrane was dried at 60° C. to remove water to obtain a multilayer porous membrane having a total film thickness of 25 μm in which a porous layer with a thickness of 6 μm was formed on the porous membrane. As the composition ratio between the inorganic filler and the resin binder in the porous layer, the resin binder had a volume fraction of 1.5%. In addition, the ratio of the layer thickness of the porous layer to the total layer thickness of the multilayer porous membrane was 24%.

The resulting multilayer porous membrane maintained excellent permeability because it had an air permeability of 170 s/100 cc and the increasing rate of the air permeability caused by forming a porous layer was 13%, which is low. In addition, the multilayer porous membrane showed extremely high heat resistance because the MD thermal shrinkage rate at 130° C. was 2%, the TD thermal shrinkage rate at 130° C. was 1%, which are low, and the shutdown temperature was observed at 155° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Comparative Example 1

The surface of the polyolefin resin porous membrane used for a substrate in Example 1 was subjected to corona discharge treatment (the discharge amount: 50 W). A solution was prepared by uniformly dispersing each of 65 parts by mass of alumina particles (the average particle diameter: 0.013 μm, the bulk density: 0.1 g/cm$^3$), 70 parts by mass of an SB latex (the density of the resin: 0.93 g/cm$^3$, the solids concentration: 50%, the minimum film forming temperature: 0° C. or lower), 1 part by mass of an ammonium polycarboxylate solution (SN-Dispersant 5468, produced by San Nopco Limited) and 1 part by mass of a polyoxyalkylene-based surfactant (SN-Wet 980, produced by San Nopco Limited) in 150 parts by mass of water. Thereafter, the solution was applied on the treated surface of the polyolefin resin porous membrane by using a bar coater. Subsequently, the resulting membrane was dried at 60° C. to remove water to obtain a multilayer porous membrane having a total film thickness of 22 μm in which a porous layer with a thickness of 6 μm was formed on the porous membrane. As the composition ratio between the inorganic filler and the resin binder in the porous layer, the resin binder had a volume fraction of 2.8%. In addition, the ratio of the layer thickness of the porous layer to the total layer thickness of the multilayer porous membrane was 27%.

The resulting multilayer porous membrane maintained excellent permeability because it had an air permeability of 230 s/100 cc and the increasing rate of the air permeability caused by forming a porous layer was 21%, which is low. However, the multilayer porous membrane was poor in heat resistance because the MD thermal shrinkage rate at 130° C. was 28%, the TD thermal shrinkage rate at 130° C. was 24%, which are high, and the short-circuit temperature was observed at 173° C., which is low.

Comparative Example 2

There was obtained a multilayer porous membrane having a total film thickness of 26 μm in which a porous layer with a thickness of 10 μm was formed on the porous membrane in the same manner as in Example 2 except that in Example 2, the alumina particles were changed to those having an average particle diameter of 3.1 μm (an average particle diameter of 3.7 μm as measured by a laser particle size distribution analyzer) and a bulk density of 1.5 g/cm$^3$, and the dispersed amount of the alumina particles and the polyvinyl alcohol was changed to 98.2 and 1.8 parts by mass, respectively. As the composition ratio between the inorganic filler and the resin binder in the porous layer, the resin binder had a volume fraction of 2.1%. In addition, the ratio of the layer thickness of the porous layer to the total layer thickness of the multilayer porous membrane was 38%.

The resulting multilayer porous membrane maintained excellent permeability because it had an air permeability of 240 s/100 cc and the increasing rate of the air permeability caused by forming a porous layer was 26%, which is low. However, the multilayer porous membrane was poor in heat resistance because the MD thermal shrinkage rate at 130° C. was 25% and the TD thermal shrinkage rate at 130° C. was 15%, which are high.

Comparative Example 3

There was obtained a multilayer porous membrane having a total film thickness of 19 μm in which a porous layer with a thickness of 3 μm was formed on the porous membrane in the same manner as in Example 1 except that in Example 1, the dispersed amount of the alumina particles was changed to 90 parts by mass and the solid content of the SB latex was changed to 10 parts by mass. As the composition ratio between the inorganic filler and the resin binder in the porous layer, the resin binder had a volume fraction of 13.4%. In addition, the ratio of the layer thickness of the porous layer to the total layer thickness of the multilayer porous membrane was 16%.

The resulting multilayer porous membrane was deteriorated in permeability because it had an air permeability of 315 s/100 cc and the increasing rate of the air permeability caused by forming a porous layer was 66%, which is high. In addition, the MD thermal shrinkage rate at 130° C. was 26% and the TD thermal shrinkage rate at 130° C. was 17%, which are high, and the short-circuit temperature was observed at 153° C., which is low.

Comparative Example 4

There was obtained a multilayer porous membrane having a total film thickness of 18 μm in which a porous layer with a thickness of 2 μm was formed on the porous membrane in the same manner as in Example 4 except that in Example 4, the thickness of the porous layer was changed to 2 μm. As the composition ratio between the inorganic filler and the resin binder in the porous layer, the resin binder had a volume fraction of 4.6%. In addition, the ratio of the layer thickness of the porous layer to the total layer thickness of the multilayer porous membrane was 11%.

The resulting multilayer porous membrane maintained excellent permeability because it had an air permeability of 200 s/100 cc, and the increasing rate of the air permeability caused by forming a porous layer was 5%, which is low. However, the multilayer porous membrane was low in heat resistance because the MD thermal shrinkage rate at 130° C. was 26% and the TD thermal shrinkage rate at 130° C. was 16%, which are high, and the short-circuit temperature was observed at 152° C., which is low.

Comparative Example 5

There was obtained a multilayer porous membrane having a total film thickness of 33 μm in the same manner as in Example 1 except that in Example 1, the dispersed amount of the alumina particles was changed to 95 parts by mass, the solid content of the SB latex was changed to 5 parts by mass, and the thickness of the porous layer was set at 17 μm. As the composition ratio between the inorganic filler and the resin binder in the porous layer, the resin binder had a volume fraction of 6.9%. In addition, the ratio of the layer thickness of the porous layer to the total layer thickness of the multilayer porous membrane was 52%.

The resulting multilayer porous membrane was deteriorated in permeability because it had an air permeability of 325 s/100 cc and the increasing rate of the air permeability caused by forming a porous layer was 71%, which is high. In addition, the multilayer porous membrane was excellent in heat resistance because the MD thermal shrinkage rate at 130° C. was 4%, the TD thermal shrinkage rate at 130° C. was 3%, which are low, and the shutdown temperature was observed at 144° C. and short-circuit was not observed even at 200° C. or higher.

Comparative Example 6

There was obtained a multilayer porous membrane having a total film thickness of 19 μm in the same manner as in Example 11 except that in Example 11, the dispersed amount of the titania particles and the polyvinyl alcohol was changed to 85 and 15 parts by mass, respectively. As the composition ratio between the inorganic filler and the resin binder in the porous layer, the resin binder had a volume fraction of 13.8%. In addition, the ratio of the layer thickness of the porous layer to the total layer thickness of the multilayer porous membrane was 16%.

The resulting multilayer porous membrane was deteriorated in permeability because it had an air permeability of 1000 s/100 cc and the increasing rate of the air permeability caused by forming a porous layer was 506%, which is extremely high. In addition, the MD thermal shrinkage rate at 130° C. was 14%, which is high, and the TD thermal shrinkage rate at 130° C. was 6%, which is low. Further, the shutdown temperature was observed at 145° C. and short-circuit was not observed even at 200° C. or higher.

Comparative Example 7

There was obtained a multilayer porous membrane having a total film thickness of 18 μm in the same manner as in Example 11 except that in Example 11, the thickness of the porous layer was changed to 2 μm. As the composition ratio between the inorganic filler and the resin binder in the porous layer, the resin binder had a volume fraction of 4.6%. In addition, the ratio of the layer thickness of the porous layer to the total layer thickness of the multilayer porous membrane was 11%.

The resulting multilayer porous membrane maintained excellent permeability because it had an air permeability of 175 s/100 cc, and the increasing rate of the air permeability caused by forming a porous layer was 6%, which is low. However, the multilayer porous membrane was low in heat resistance because the MD thermal shrinkage rate at 130° C. was 23% and the TD thermal shrinkage rate at 130° C. was 16%, which are high, and the short-circuit temperature was observed at 154° C., which is low.

Comparative Example 8

There was obtained a multilayer porous membrane having a total film thickness of 39 μm in the same manner as in Example 11 except that in Example 11, the thickness of the porous layer was changed to 23 μm. As the composition ratio between the inorganic filler and the resin binder in the porous layer, the resin binder had a volume fraction of 4.6%. In addition, the ratio of the layer thickness of the porous layer to the total layer thickness of the multilayer porous membrane was 59%.

The resulting multilayer porous membrane was deteriorated in permeability because it had an air permeability of 360 s/100 cc and the increasing rate of the air permeability caused by forming a porous layer was 118%, which is high. In addition, the multilayer porous membrane was excellent in heat resistance because the MD thermal shrinkage rate at 130° C. was 3%, the TD thermal shrinkage rate at 130° C. was 2%, which are low, and the shutdown temperature was observed at 145° C. and short-circuit was not observed even at 200° C. or higher.

Comparative Example 9

When a similar evaluation was performed without forming a porous layer on the surface of the polyolefin resin porous membrane used for a substrate in Example 1, the MD thermal shrinkage rate at 130° C. was 28% and the TD thermal shrinkage rate at 130° C. was 25%, which are high. In addition, the shutdown temperature was observed at 152° C., but the short-circuit temperature was observed at 155° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 10

When a similar evaluation was performed without forming a porous layer on the surface of the polyolefin resin porous membrane used for a substrate in Example 10, the MD thermal shrinkage rate at 130° C. was 28% and the TD thermal shrinkage rate at 130° C. was 26%, which are high. In addition, the shutdown temperature was observed at 148° C., but the short-circuit temperature was observed at 152° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 11

When a similar evaluation was performed without forming a porous layer on the surface of the polyolefin resin porous membrane used for a substrate in Example 13, the MD thermal shrinkage rate at 130° C. was 20% and the TD thermal shrinkage rate at 130° C. was 16%, which are high. In addition, the shutdown temperature was observed at 149° C., but the short-circuit temperature was observed at 153° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 12

When a similar evaluation was performed without forming a porous layer on the surface of the polyolefin resin porous membrane used for a substrate in Example 14, the MD thermal shrinkage rate at 130° C. was 19% and the TD thermal shrinkage rate at 130° C. was 19%, which are high. In addition, the shutdown temperature was observed at 147° C., but the short-circuit temperature was observed at 150° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 13

When a similar evaluation was performed without forming a porous layer on the surface of the polyolefin resin porous membrane used for a substrate in Example 23, the MD thermal shrinkage rate at 130° C. was 17% and the TD thermal shrinkage rate at 130° C. was 22%, which are high. In addition, the shutdown temperature was observed at 151° C., but the short-circuit temperature was observed at 153° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

The physical properties in the above Examples and Comparative Examples are collectively shown in Table 1.

TABLE 1

| | Polyolefin resin porous membrane | | Inorganic filler | | | Resin binder | | | |
|---|---|---|---|---|---|---|---|---|---|
| | Film thickness (µm) | Air permeability (s/100 cc) | Type | Average particle diameter (µm) | Bulk density (g/cm3) | Type | Density (g/cm3) | Mass fraction (wt %) | Volume fraction (vol %) |
| Ex. 1 | 16 | 190 | Al2O3 | 0.20 | 1.3 | SB | 0.93 | 4.0% | 5.5 |
| Ex. 2 | 16 | 190 | Al2O3 | 0.70 | 0.9 | PVA | 1.28 | 4.0% | 2.7 |
| Ex. 3 | 16 | 190 | Al2O3 | 0.70 | 0.9 | SB | 0.93 | 4.0% | 3.7 |
| Ex. 4 | 16 | 190 | Al2O3 | 0.70 | 0.9 | SB | 0.93 | 5.0% | 4.6 |
| Ex. 5 | 16 | 190 | Al2O3 | 0.70 | 0.9 | SB | 0.93 | 5.0% | 4.6 |
| Ex. 6 | 16 | 190 | Al2O3 | 0.61 | 1.5 | SB | 0.93 | 4.0% | 6.3 |
| Ex. 7 | 16 | 190 | Al2O3 | 0.61 | 1.5 | SB | 0.93 | 5.0% | 7.8 |
| Ex. 8 | 16 | 190 | Al2O3 | 0.61 | 1.5 | SB | 0.93 | 5.0% | 7.8 |
| Ex. 9 | 16 | 190 | Al2O3 | 1.0 | 1.2 | SB | 0.93 | 6.0% | 7.6 |
| Ex. 10 | 16 | 165 | TiO2 | 0.40 | 1.2 | PVA | 1.28 | 3.0% | 2.7 |
| Ex. 11 | 16 | 165 | TiO2 | 0.40 | 1.2 | PVA | 1.28 | 5.0% | 4.6 |
| Ex. 12 | 16 | 165 | TiO2 | 0.40 | 1.2 | PVA | 1.28 | 5.0% | 4.6 |
| Ex. 13 | 20 | 280 | TiO2 | 0.40 | 1.2 | PVA | 1.28 | 5.0% | 4.6 |
| Ex. 14 | 16 | 235 | TiO2 | 0.40 | 1.2 | PVA | 1.28 | 5.0% | 4.6 |
| Ex. 15 | 16 | 165 | TiO2 | 0.40 | 1.2 | PVA | 1.28 | 5.0% | 4.6 |
| Ex. 16 | 16 | 165 | TiO2 | 0.40 | 1.2 | SB | 0.93 | 5.0% | 6.2 |
| Ex. 17 | 16 | 165 | TiO2 | 0.40 | 1.2 | SB | 0.93 | 6.0% | 7.4 |
| Ex. 18 | 16 | 190 | Al2O3 | 0.51 | 1.2 | PVA | 1.28 | 1.8% | 1.7 |
| Ex. 19 | 16 | 190 | Al2O3 | 0.85 | 1.2 | PVA | 1.28 | 1.4% | 1.3 |
| Ex. 20 | 16 | 190 | Al2O3 | 1.5 | 1.4 | PVA | 1.28 | 1.8% | 2.0 |
| Ex. 21 | 16 | 190 | Al2O3 | 0.70 | 0.9 | PVA | 1.28 | 0.7% | 0.5 |
| Ex. 22 | 16 | 190 | Al2O3 | 0.51 | 1.2 | PVA | 1.28 | 1.2% | 1.1 |
| Ex. 23 | 19 | 150 | Al2O3 | 0.85 | 1.2 | PVA | 1.28 | 1.6% | 1.5 |
| Com. Ex. 1 | 16 | 190 | Al2O3 | 0.01 | 0.1 | SB | 0.93 | 35.0% | 2.8 |
| Com. Ex. 2 | 16 | 190 | Al2O3 | 3.1 | 1.5 | PVA | 1.28 | 1.8% | 2.1 |
| Com. Ex. 3 | 16 | 190 | Al2O3 | 0.20 | 1.3 | SB | 0.93 | 10.0% | 13.4 |
| Com. Ex. 4 | 16 | 190 | Al2O3 | 0.70 | 0.9 | SB | 0.93 | 5.0% | 4.6 |
| Com. Ex. 5 | 16 | 190 | Al2O3 | 0.20 | 1.3 | SB | 0.93 | 5.0% | 6.9 |
| Com. Ex. 6 | 16 | 165 | TiO2 | 0.40 | 1.2 | PVA | 1.28 | 15.0% | 13.8 |
| Com. Ex. 7 | 16 | 165 | TiO2 | 0.40 | 1.2 | PVA | 1.28 | 5.0% | 4.6 |
| Com. Ex. 8 | 16 | 165 | TiO2 | 0.40 | 1.2 | PVA | 1.28 | 5.0% | 4.6 |
| Com. Ex. 9 | 16 | 190 | No | — | — | No | — | 0.0% | 0 |
| Com. Ex. 10 | 16 | 165 | No | — | — | No | — | 0.0% | 0 |
| Com. Ex. 11 | 20 | 280 | No | — | — | No | — | 0.0% | 0 |
| Com. Ex. 12 | 16 | 235 | No | — | — | No | — | 0.0% | 0 |
| Com. Ex. 13 | 19 | 150 | No | — | — | No | — | 0.0% | 0 |

| | Layer thickness (µm) | Air permeability (s/100 cc) | Layer thickness ratio (%) | Increasing rate of air permeability (%) | Thermal shrinkage rate (%) 130° C. MD | Thermal shrinkage rate (%) 130° C. TD | Shutdown temperature (° C.) | Short-circuit temperature (° C.) |
|---|---|---|---|---|---|---|---|---|
| Ex. 1 | 4 | 210 | 20 | 11 | 10 | 6 | 148 | >200 |
| Ex. 2 | 7 | 265 | 30 | 39 | 4 | 3 | 143 | >200 |
| Ex. 3 | 4 | 215 | 20 | 13 | 9 | 6 | 140 | >200 |
| Ex. 4 | 3 | 205 | 16 | 8 | 7 | 6 | 142 | >200 |
| Ex. 5 | 7 | 240 | 30 | 26 | 5 | 4 | 143 | >200 |
| Ex. 6 | 5 | 220 | 24 | 16 | 10 | 8 | 150 | >200 |
| Ex. 7 | 5 | 225 | 24 | 18 | 10 | 5 | 145 | >200 |
| Ex. 8 | 14 | 270 | 47 | 42 | 3 | 2 | 144 | >200 |
| Ex. 9 | 5 | 220 | 24 | 16 | 9 | 5 | 147 | >200 |
| Ex. 10 | 5 | 190 | 24 | 15 | 8 | 4 | 142 | >200 |
| Ex. 11 | 3 | 180 | 16 | 9 | 10 | 6 | 145 | >200 |
| Ex. 12 | 6 | 200 | 27 | 21 | 8 | 4 | 145 | >200 |
| Ex. 13 | 6 | 320 | 23 | 14 | 4 | 2 | 148 | >200 |
| Ex. 14 | 7 | 285 | 30 | 21 | 3 | 1 | 145 | >200 |
| Ex. 15 | 8 | 240 | 33 | 45 | 3 | 3 | 147 | >200 |
| Ex. 16 | 8 | 180 | 33 | 9 | 10 | 6 | 149 | >200 |
| Ex. 17 | 4 | 175 | 20 | 6 | 10 | 7 | 145 | >200 |
| Ex. 18 | 5 | 205 | 24 | 8 | 2 | 1 | 143 | >200 |
| Ex. 19 | 6 | 210 | 27 | 11 | 2 | 1 | 143 | >200 |
| Ex. 20 | 6 | 240 | 27 | 26 | 3 | 1 | 144 | >200 |
| Ex. 21 | 7 | 200 | 30 | 5 | 10 | 5 | 144 | >200 |
| Ex. 22 | 15 | 240 | 48 | 26 | 2 | 1 | 145 | >200 |
| Ex. 23 | 6 | 170 | 24 | 13 | 2 | 1 | 155 | >200 |
| Com. Ex. 1 | 6 | 230 | 27 | 21 | 28 | 24 | 149 | 173 |
| Com. Ex. 2 | 10 | 240 | 38 | 26 | 25 | 15 | 146 | >200 |
| Com. Ex. 3 | 3 | 315 | 16 | 66 | 26 | 17 | 148 | 153 |
| Com. Ex. 4 | 2 | 200 | 11 | 5 | 26 | 16 | 145 | 152 |

TABLE 1-continued

| | | | | | | | | |
|---|---|---|---|---|---|---|---|---|
| Com. Ex. 5 | 17 | 325 | 52 | 71 | 4 | 3 | 144 | >200 |
| Com. Ex. 6 | 3 | 1000 | 16 | 506 | 14 | 6 | 145 | >200 |
| Com. Ex. 7 | 2 | 175 | 11 | 6 | 23 | 16 | 146 | 154 |
| Com. Ex. 8 | 23 | 360 | 59 | 118 | 3 | 2 | 145 | >200 |
| Com. Ex. 9 | 0 | 190 | 0 | 0 | 28 | 25 | 152 | 155 |
| Com. Ex. 10 | 0 | 165 | 0 | 0 | 28 | 26 | 148 | 152 |
| Com. Ex. 11 | 0 | 280 | 0 | 0 | 20 | 16 | 149 | 153 |
| Com. Ex. 12 | 0 | 235 | 0 | 0 | 19 | 19 | 147 | 150 |
| Com. Ex. 13 | 0 | 150 | 0 | 0 | 17 | 22 | 151 | 153 |

Al2O3: Alumina
TiO2: Titania
SB: SB Latex
PVA: Polyvinyl alcohol

Example 24

A mixture was prepared by adding 47.5 parts by mass of polyethylene having a viscosity average molecular weight (Mv) of 200000, 2.5 parts by mass of polypropylene having an Mv of 400000, 30 parts by mass of liquid paraffin (LP) as a plasticizer and 0.5 parts by mass of pentaerythrityl-tetrakis-[3-(3,5-di-t-butyl-4-hydroxyphenyl)propionate] as an antioxidant, and the mixture was preliminarily blended by a Henschel mixer. The resulting mixture was fed into the feed inlet of a simultaneous co-rotating twin-screw extruder by a feeder. In addition, liquid paraffin was side fed into a twin-screw extruder cylinder so that the ratio of the amount of the liquid paraffin to the amount of the total mixture (100 parts by mass) to be melted and kneaded and extruded is 50 parts by mass. The melting and kneading was carried out under the conditions of a setting temperature of 200° C., a screw rotation number of 200 rpm and a discharging amount of 15 kg/h. Subsequently, the melted and kneaded product was extruded through a T-die into between cold rollers controlled so as to have a surface temperature of 25° C., thereby obtaining a sheet-like polyolefin composition having a thickness of 1050 μm. Thereafter, the polyolefin composition was continuously introduced into a simultaneous biaxial tenter stretching machine and was simultaneously biaxially stretched to 7 times in the MD direction and to 6.4 times in the TD direction. At that time, the setting temperature of the simultaneous biaxial tenter was 118° C. Next, the resulting product was introduced into a methyl ethyl ketone bath to remove the plasticizer, followed by drying to remove methyl ethyl ketone. Further, the resulting product was introduced into a TD tenter heat fixation machine to thermally fix. The heat fixation conditions were set at the maximum stretching ratio of 1.5 times, the final stretching ratio of 1.3 times, the setting temperature at the time of the maximum stretching of 123° C. and the setting temperature at the time of the final stretching of 128° C. As a result, there was obtained a polyolefin resin porous membrane having an MD maximum thermal shrinkage force of 3.8 g, a TD maximum thermal shrinkage force of 2.9 g, a film thickness of 16 μm, a porosity of 45% and an air permeability of 235 s/100 cc.

A solution was prepared by uniformly dispersing each of 95 parts by mass of alumina particles (the average particle diameter: 0.7 μm) and 5 parts by mass of a polyvinyl alcohol (the average degree of polymerization: 1700, the degree of saponification: 99% or more) in 150 parts by mass of water. The solution was applied on the surface of the polyolefin resin porous membrane by using a gravure coater. Thereafter, the resulting membrane was dried at 60° C. to remove water to obtain a multilayer porous membrane having a total film thickness of 20 μm in which a porous layer (the volume fraction of the binder: 3.6%) with a thickness of 4 μm was formed on the porous membrane, The resulting multilayer porous membrane maintained excellent permeability because it had an air permeability of 255 s/100 cc and the increasing rate of the air permeability caused by forming a porous layer was 9%, which is low. In addition, the multilayer porous membrane showed extremely high heat resistance because the MD thermal shrinkage rate at 150° C. was 3%, the TD thermal shrinkage rate at 130° C. was 3%, which are low, and the shutdown temperature was observed at 146° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 25

The surface of the polyolefin resin porous membrane used for a substrate in Example 24 was subjected to corona discharge treatment (the discharge amount: 50 W). A solution was prepared by uniformly dispersing each of 95 parts by mass of alumina particles (the average particle diameter: 0.7 μm), 10 parts by mass of an SB latex (the solids concentration: 50%, the minimum film forming temperature: 0° C. or lower), 1 part by mass of an ammonium polycarboxylate solution (SN-Dispersant 5468, produced by San Nopco Limited) and 1 part by mass of a polyoxyalkylene-based surfactant (SN-Wet 980, produced by San Nopco Limited) in 150 parts by mass of water. Thereafter, the solution was applied on the treated surface (the wetting index of the surface: 73 mN/m or more) of the polyolefin resin porous membrane by using a gravure coater. Subsequently, the resulting membrane was dried at 60° C. to remove water to obtain a multilayer porous membrane having a total film thickness of 23 μm in which a porous layer (the volume fraction of the binder: 4.8%) with a thickness of 7 μm was formed on the porous membrane.

The resulting multilayer porous membrane maintained excellent permeability because it had an air permeability of 280 s/100 cc and the increasing rate of the air permeability caused by forming a porous layer was 19%, which is low. In addition, the multilayer porous membrane showed extremely high heat resistance because the MD thermal shrinkage rate at 150° C. was 2%, the TO thermal shrinkage rate at 150° C. was 2%, which are low, and the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 26

A mixture was prepared by adding 16.5 parts by mass of polyethylene having a viscosity average molecular weight (Mv) of 700000, 16.1 parts by mass of polyethylene having an Mv of 300000, 2.5 parts by mass of polypropylene having an Mv of 400000, 40 parts by mass of liquid paraffin (LP) as a plasticizer and 0.3 parts by mass of pentaerythrityl-tetrakis-[3-(3,5-di-t-butyl-4-hydroxyphenyl)propionate] as an antioxidant, and the mixture was preliminarily blended by a Henschel mixer. The resulting mixture was fed into the feed inlet of a simultaneous co-rotating twin-screw extruder by a feeder. In addition, liquid paraffin was side fed into a twin-screw extruder cylinder so that the ratio of the amount of the liquid paraffin to the amount of the total mixture (100 parts by mass) to be melted and kneaded and extruded is 65 parts by mass. The melting and kneading was carried out under the conditions of a setting temperature of 200° C., a screw rotation number of 240 rpm and a discharging amount of 12 kg/h. Subsequently, the melted and kneaded product was extruded through a T-die into between cold rollers controlled so as to have a surface temperature of 25° C., thereby obtaining a sheet-like polyolefin composition having a thickness of 2400 μm. Thereafter, the polyolefin composition was continuously introduced into a simultaneous biaxial tenter stretching machine and was simultaneously biaxially stretched to 7 times in the MD direction and to 7.0 times in the TD direction. At that time, the setting temperature of the simultaneous biaxial tenter was 125° C. Next, the resulting product was introduced into a methyl ethyl ketone bath to remove the plasticizer, followed by drying to remove methyl ethyl ketone. Further, the resulting product was introduced into a TD tenter heat fixation machine to thermally fix. The heat fixation temperature was set at 133° C. and the TD relaxation rate was set at 0.80. As a result, there was obtained a polyolefin resin porous membrane having an MD maximum thermal shrinkage force of 4.8 g, a TD maximum thermal shrinkage force of 3.7 g, a film thickness of 20 μm, a porosity of 40% and an air permeability of 280 s/100 cc.

The surface of the polyolefin resin porous membrane was subjected to corona discharge treatment (the discharge amount: 50 W). A solution was prepared by uniformly dispersing each of 95 parts by mass of titania particles (the average particle diameter: 0.4 μm), 10 parts by mass of an SB latex (the solids concentration: 50%, the minimum film forming temperature: 0° C. or lower), 1 part by mass of an ammonium polycarboxylate solution (SN-Dispersant 5468, produced by San Nopco Limited) and 1 part by mass of a polyoxyalkylene-based surfactant (SN-Wet 980, produced by San Nopco Limited) in 150 parts by mass of water. Thereafter, the solution was applied on the treated surface (the wetting index of the surface: 73 mN/m or more) of the polyolefin resin porous membrane by using a bar coater. Subsequently, the resulting membrane was dried at 60° C. to remove water to obtain a multilayer porous membrane having a total film thickness of 26 μm in which a porous layer (the volume fraction of the binder: 6.4%) with a thickness of 6 μm was formed on the porous membrane.

The resulting multilayer porous membrane maintained excellent permeability because it had an air permeability of 315 s/100 cc and the increasing rate of the air permeability caused by forming a porous layer was 13%, which is low. In addition, the multilayer porous membrane showed extremely high heat resistance because the MD thermal shrinkage rate at 150° C. was 8%, the TD thermal shrinkage rate at 150° C. was 5%, which are low, and the shutdown temperature was observed at 147° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 27

A mixture was prepared by adding 16.6 parts by mass of polyethylene having a viscosity average molecular weight (Mv) of 700000, 16.6 parts by mass of polyethylene having an Mv of 250000, 1.8 parts by mass of polypropylene having an Mv of 400000, 40 parts by mass of liquid paraffin (LP) as a plasticizer and 0.3 parts by mass of pentaerythrityl-tetrakis-[3-(3,5-di-t-butyl-4-hydroxyphenyl)propionate] as an antioxidant, and the mixture was preliminarily blended by a Henschel mixer. The resulting mixture was fed into the feed inlet of a simultaneous co-rotating twin-screw extruder by a feeder. In addition, liquid paraffin was side fed into a twin-screw extruder cylinder so that the ratio of the amount of the liquid paraffin to the amount of the total mixture (100 parts by mass) to be melted and kneaded and extruded is 65 parts by mass. The melting and kneading was carried out under the conditions of a setting temperature of 200° C., a screw rotation number of 240 rpm and a discharging amount of 12 kg/h. Subsequently, the melted and kneaded product was extruded through a T-die into between cold rollers controlled so as to have a surface temperature of 25° C., thereby obtaining a sheet-like polyolefin composition having a thickness of 1300 μm. Thereafter, the polyolefin composition was continuously introduced into a simultaneous biaxial tenter stretching machine and was simultaneously biaxially stretched to 7 times in the MD direction and to 6.4 times in the TD direction. At that time, the setting temperature of the simultaneous biaxial tenter was 118° C. Next, the resulting product was introduced into a methyl ethyl ketone bath to remove the plasticizer, followed by drying to remove methyl ethyl ketone. Further, the resulting product was introduced into a TD tenter heat fixation machine to thermally fix. The heat fixation temperature was set at 122° C. and the TD relaxation rate was set at 0.80. As a result, there was obtained a polyolefin resin porous membrane having an MD maximum thermal shrinkage force of 6.7 g, a TD maximum thermal shrinkage force of 2.8 g, a film thickness of 17 μm, a porosity of 49% and an air permeability of 165 s/100 cc.

The surface of the polyolefin resin porous membrane was subjected to corona discharge treatment (the discharge amount: 50 W). A solution was prepared by uniformly dispersing each of 95 parts by mass of titania particles (the average particle diameter: 0.4 μm) and 5 parts by mass of a polyvinyl alcohol (the average degree of polymerization: 1700, the degree of saponification: 99% or more) in 150 parts by mass of water. Thereafter, the solution was applied on the treated surface (the wetting index of the surface: 73 mN/m or more) of the polyolefin resin porous membrane by using a gravure coater. Subsequently, the resulting membrane was dried at 60° C. to remove water to obtain a multilayer porous membrane having a total film thickness of 24 μm in which a porous layer (the volume fraction of the binder: 4.7%) with a thickness of 7 μm was formed on the porous membrane.

The resulting multilayer porous membrane maintained excellent permeability because it had an air permeability of 200 s/100 cc and the increasing rate of the air permeability caused by forming a porous layer was 21%, which is low. In addition, the multilayer porous membrane showed extremely high heat resistance because the MD thermal shrinkage rate at 150° C. was 5%, the TD thermal shrinkage rate at 150° C. was 4%, which are low, and the shutdown temperature was observed at 144° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 28

A mixture was prepared by mixing 12 parts by mass of an ultra-high molecular weight polyethylene having a viscosity average molecular weight (Mv) of 2000000, 12 parts by mass of a high-density polyethylene having an Mv of 280000, 16 parts by mass of a linear low-density polyethylene having an Mv of 150000, 17.6 parts by mass of silica (the average particle diameter: 8.3 μm) and 42.4 parts by mass of dioctyl phthalate (DOP) as a plasticizer, and the mixture was granulated, followed by kneading and extruding with a twin-screw extruder equipped with a T-die to form into a sheet having a thickness of 90 μm. The DOP and silica was extracted and removed from the resulting product with methylene chloride and with sodium hydroxide, respectively, to form a microporous membrane. The microporous membrane was stretched to 5.3 times in the machine direction and 1.8 times in the transverse direction while heating the microporous membrane at 118° C. As a result, there was obtained a polyolefin resin porous membrane having an MD maximum thermal shrinkage force of 8.7 g, a TD maximum thermal shrinkage force of 0.9 g, a film thickness of 11 μm, a porosity of 48% and an air permeability of 55 s/100 cc.

A solution was prepared by uniformly dispersing each of 95 parts by mass of titanic particles (the average particle diameter: 0.4 μm) and 5 parts by mass of a polyvinyl alcohol (the average degree of polymerization: 1700, the degree of saponification: 99% or more) in 150 parts by mass of water. Thereafter, the solution was applied on the surface of the polyolefin resin porous membrane by using a bar coater. Subsequently, the resulting membrane was dried at 60° C. to remove water to obtain a multilayer porous membrane having a total film thickness of 19 μm in which a porous layer (the volume fraction of the binder: 4.7%) with a thickness of 8 μm was formed on the porous membrane.

The resulting multilayer porous membrane had a desirably increased air permeability of 240 s/100 cc. In addition, the multilayer porous membrane showed extremely high heat resistance because the MD thermal shrinkage rate at 150° C. was 4%, the TD thermal shrinkage rate at 150° C. was 3%, which are low, and the shutdown temperature was observed at 150° C. and short-circuit was not observed even at 200° C. or higher.

According to the battery evaluation performed by using the multilayer porous membrane as a separator, a found that the rate property was 90% or more, which is high, and the cycle property was excellent because the capacity maintenance rate after 100 cycles was 90% or more.

Example 29

A mixture was prepared by adding 16.6 parts by mass of polyethylene having a viscosity average molecular weight (Mv) of 700000, 16.6 parts by mass of polyethylene having an Mv of 250000, 1.8 parts by mass of polypropylene having an Mv of 400000, 40 parts by mass of liquid paraffin (LP) as a plasticizer and 0.3 parts by mass of pentaerythrityl-tetrakis-[3-(3,5-di-t-butyl-4-hydroxyphenyl)propionate] as an antioxidant, and the mixture was preliminarily blended by a Henschel mixer. The resulting mixture was fed into the feed inlet of a simultaneous co-rotating twin-screw extruder by a feeder. In addition, liquid paraffin was side fed into a twin-screw extruder cylinder so that the ratio of the amount of the liquid paraffin to the amount of the total mixture (100 parts by mass) to be melted and kneaded and extruded is 65 parts by mass. The melting and kneading was carried out under the conditions of a setting temperature of 200° C., a screw rotation number of 240 rpm and a discharging amount of 12 kg/h. Subsequently, the melted and kneaded product was extruded through a T-die into between cold rollers controlled so as to have a surface temperature of 25° C., thereby obtaining a sheet-like polyolefin composition having a thickness of 1000 μm. Thereafter, the polyolefin composition was continuously introduced into a simultaneous biaxial tenter stretching machine and was simultaneously biaxially stretched to 7 times in the MD direction and to 6.4 times in the TD direction. At that time, the setting temperature of the simultaneous biaxial tenter was 118° C. Next, the resulting product was introduced into a methyl ethyl ketone bath to remove the plasticizer, followed by drying to remove methyl ethyl ketone. Further, the resulting product was introduced into a TD tenter heat fixation machine to thermally fix. The heat fixation temperature was set at 130° C. and the TD relaxation rate was set at 0.80. As a result, there was obtained a polyolefin resin porous membrane having an MD maximum thermal shrinkage force of 3.6 g, a TD maximum thermal shrinkage force of 3.3 g, a film thickness of 12 μm, a porosity of 36% and an air permeability of 230 s/100 cc, The surface of the polyolefin resin porous membrane was subjected to corona discharge treatment (the discharge amount: 50 W). A solution was prepared by uniformly dispersing each of 95 parts by mass of alumina particles (the average particle diameter: 2.0 μm) and 5 parts by mass of a polyvinyl alcohol (the average degree of polymerization: 1700, the degree of saponification: 99% or more) in 150 parts by mass of water. Thereafter, the solution was applied on the treated surface (the wetting index of the surface: 73 mN/m or more) of the polyolefin resin porous membrane by using a gravure coater. Subsequently, the resulting membrane was dried at 60° C. to remove water to obtain a multilayer porous membrane having a total film thickness of 20 μm in which a porous layer (the volume fraction of the binder: 4.7%) with a thickness of 8 μm was formed on the porous membrane.

The resulting multilayer porous membrane maintained excellent permeability because it had an air permeability of 330 s/100 cc and the increasing rate of the air permeability caused by forming a porous layer was 43%, which is low. In addition, the multilayer porous membrane showed extremely high heat resistance because the MD thermal shrinkage rate at 150° C. was 2%, the TD thermal shrinkage rate at 150° C. was 2%, which are low, and the shutdown temperature was observed at 147° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 30

There were dry blended 47 parts by mass of polyethylene having a viscosity average molecular weight (Mv) of 700000, 46 parts by mass of a homopolymer polyethylene having an Mv of 250000 and 7 parts by mass of polypropylene having an Mv of 400000 using a tumbler blender. To 99% by weight of the resulting pure polymer mixture was added 1% by mass of pentaerythrityl-tetrakis-[3-(3,5-di-t-butyl-4-hydroxyphenyl)propionate] as an antioxidant, followed by dry blending again using a tumbler blender to obtain a mixture of the polymers and the like. The resulting mixture of the polymers and the like was treated with nitrogen to replace the air, and was then fed to a twin-screw extruder by a feeder under a nitrogen atmosphere. Liquid paraffin (kinematic viscosity at 37.78° C.: $7.59\times10^{-5}$ $m^2/s$) was injected into the extruder cylinder with a plunger pump. The feeder and the pump were adjusted so that the ratio of the amount of the liquid paraffin to the amount of the total mixture to be melted and kneaded and extruded is 65 parts by mass. The melting and kneading was carried out under the conditions of a setting temperature of 200° C., a screw rotation number of 240 rpm and a discharging amount of 12 kg/h.

Subsequently, the melted and kneaded product was extrusion-cast through a T-die onto cold rollers controlled so as to have a surface temperature of 25° C., thereby obtaining a sheet-like polyolefin composition having a thickness of 2000 μm.

Thereafter, the polyolefin composition was continuously introduced into a simultaneous biaxial tenter stretching machine and was simultaneously biaxially stretched to 7 times in the MD direction and to 7 times in the TD direction. At that time, the setting temperature of the simultaneous biaxial tenter was 125° C. Next, the resulting product was introduced into a methyl ethyl ketone bath to remove the plasticizer, followed by drying to remove methyl ethyl ketone.

Further, the resulting product was introduced into a TD tenter heat fixation machine to thermally fix. The heat fixation temperature was set at 133° C. and the TD relaxation rate was set at 0.80. As a result, there was obtained a polyolefin resin porous membrane having an MD maximum thermal shrinkage force of 3.2 g, a TD maximum thermal shrinkage force of 3.1 g, a film thickness of 16 μm, a porosity of 40% and an air permeability of 165 s/100 cc.

The surface of the polyolefin resin porous membrane was subjected to corona discharge treatment (the discharge amount: 50 W). A solution was prepared by uniformly dispersing each of 98.2 parts by mass of alumina particles (the average particle diameter: 0.51 μm (average particle diameter of 0.61 μm as measured by a laser particle size distribution analyzer)) and 1.8 parts by mass of a polyvinyl alcohol (the average degree of polymerization: 1700, the degree of saponification: 99% or more) in 150 parts by mass of water. Thereafter, the solution was applied on the treated surface (the wetting index of the surface: 73 mN/m or more) of the polyolefin resin porous membrane by using a gravure coater. Subsequently, the resulting membrane was dried at 60° C. to remove water to obtain a multilayer porous membrane having a total film thickness of 21 μm in which a porous layer (the volume fraction of the binder: 1.7%) with a thickness of 5 μm was formed on the porous membrane.

The resulting multilayer porous membrane maintained excellent permeability because it had an air permeability of 180 s/100 cc and the increasing rate of the air permeability caused by forming a porous layer was 9%, which is low. In addition, the multilayer porous membrane showed extremely high heat resistance because the MD thermal shrinkage rate at 150° C. was 3%, the TD thermal shrinkage rate at 150° C. was 2%, which are low, and the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 31

A mixture was prepared by adding 16.6 parts by mass of polyethylene having a viscosity average molecular weight (Mv) of 700000, 16.6 parts by mass of polyethylene having an Mv of 250000, 1.8 parts by mass of polypropylene having an Mv of 400000, 40 parts by mass of liquid paraffin (LP) as a plasticizer and 0.3 parts by mass of pentaerythrityl-tetrakis-[3-(3,5-di-t-butyl-4-hydroxyphenyl)propionate] as an antioxidant, and the mixture was preliminarily blended by a Henschel mixer. The resulting mixture was fed into the feed inlet of a simultaneous co-rotating twin-screw extruder by a feeder. In addition, liquid paraffin was side fed into a twin-screw extruder cylinder so that the ratio of the amount of the liquid paraffin to the amount of the total mixture (100 parts by mass) to be melted and kneaded and extruded is 65 parts by mass. The melting and kneading was carried out under the conditions of a setting temperature of 200° C., a screw rotation number of 240 rpm and a discharging amount of 12 kg/h. Subsequently, the melted and kneaded product was extruded through a T-die into between cold rollers controlled so as to have a surface temperature of 25° C., thereby obtaining a sheet-like polyolefin composition having a thickness of 1300 μm. Thereafter, the polyolefin composition was continuously introduced into a simultaneous biaxial tenter stretching machine and was simultaneously biaxially stretched to 7 times in the MD direction and to 6.4 times in the TD direction. At that time, the setting temperature of the simultaneous biaxial tenter was 120° C. Next, the resulting product was introduced into a methyl ethyl ketone bath to remove the plasticizer, followed by drying to remove methyl ethyl ketone. Further, the resulting product was introduced into a TD tenter heat fixation machine to thermally fix. The heat fixation temperature was set at 125° C. and the TD relaxation rate was set at 0.80. As a result, there was obtained a polyolefin resin porous membrane having an MD maximum thermal shrinkage force of 6.0 g, a TD maximum thermal shrinkage force of 2.1 g, a film thickness of 16 μm, a porosity of 46% and an air permeability of 190 s/100 cc.

The surface of the polyolefin resin porous membrane was subjected to corona discharge treatment (the discharge amount: 50 W). A solution was prepared by uniformly dispersing each of 98.2 parts by mass of alumina particles (the average particle diameter: 0.51 (average particle diameter of 0.61 μm as measured by a laser particle size distribution analyzer)) and 1.8 parts by mass of a polyvinyl alcohol (the average degree of polymerization: 1700, the degree of saponification: 99% or more) in 150 parts by mass of water. Thereafter, the solution was applied on the treated surface (the wetting index of the surface: 73 mN/m or more) of the polyolefin resin porous membrane by using a gravure coater. Subsequently, the resulting membrane was dried at 60° C. to remove water to obtain a multilayer porous membrane having a total film thickness of 22 μm in which a porous layer (the volume fraction of the binder: 1.7%) with a thickness of 6 μm was formed on the porous membrane.

The resulting multilayer porous membrane maintained excellent permeability because it had an air permeability of 210 s/100 cc and the increasing rate of the air permeability caused by forming a porous layer was 11%, which is low. In addition, the multilayer porous membrane showed extremely high heat resistance because the MD thermal shrinkage rate at 150° C. was 5%, the TD thermal shrinkage rate at 150° C. was 3%, which are low, and the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 32

There was obtained a polyolefin resin porous membrane having an MD maximum thermal shrinkage force of 4.9 g, a TD maximum thermal shrinkage force of 3.7 g, a film thickness of 25 μm, a porosity of 43% and an air permeability of 290 s/100 cc in the same manner as in Example 26 except that in Example 26, the relaxation rate at the time of heat fixation was changed to 0.90.

The surface of the polyolefin resin porous membrane was subjected to corona discharge treatment (the discharge amount: 50 W). A solution was prepared by uniformly dispersing each of 98.4 parts by mass of alumina particles (the average particle diameter: 0.85 μm (average particle diameter of 1.2 μm as measured by a laser particle size distribution analyzer)) and 1.6 parts by mass of a polyvinyl alcohol (the average degree of polymerization: 1700, the degree of saponification: 99% or more) in 150 parts by mass of water. Thereafter the solution was applied on the treated surface (the wetting index of the surface: 73 mN/m or more) of the polyolefin resin porous membrane by using a gravure coater. Subsequently, the resulting membrane was dried at 50° C. to remove water to obtain a multilayer porous membrane having a total film thickness of 31 m in which a porous layer (the volume fraction of the binder: 1.5%) with a thickness of 6 μm was formed on the porous membrane.

The resulting multilayer porous membrane maintained excellent permeability because it had an air permeability of 310 s/100 cc and the increasing rate of the air permeability caused by forming a porous layer was 7%, which is low. In addition, the multilayer porous membrane showed extremely high heat resistance because the MD thermal shrinkage rate at 150° C. was 2%, the TD thermal shrinkage rate at 150° C. was 2%, which are low, and the shutdown temperature was observed at 147° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Comparative Example 14

A mixture was prepared by mixing 19.2 parts by mass of polyethylene having a viscosity average molecular weight (Mv) of 1000000, 12.8 parts by mass of polyethylene having an Mv of 250000, 20 parts by mass of silica (the average particle diameter: 8.3 μm) and 48 parts by mass of dioctyl phthalate (DOP), and the mixture was granulated, followed by kneading and extruding with a twin-screw extruder equipped with a T-die to form into a sheet-like shape having a thickness of 90 μm. The DOP and the fine powder silica were extracted and removed from the resulting formed product with methylene chloride and with sodium hydroxide, respectively, to form a microporous membrane. The microporous membrane was stretched to 4.5 times in the machine direction while heating the microporous membrane at 110° C. and then was stretched to 2.0 times in the transverse direction while heating the microporous membrane at 130° C. As a result, there was obtained a polyolefin resin porous membrane having an MD maximum thermal shrinkage force of 12.9 g, a TD maximum thermal shrinkage force of 1.2 g, a film thickness of 18 μm, a porosity of 48% and an air permeability of 125 s/100 cc.

A solution was prepared by uniformly dispersing each of 95 parts by mass of titania particles (the average particle diameter: 0.4 μm) and 5 parts by mass of a polyvinyl alcohol (the average degree of polymerization: 1700, the degree of saponification: 99% or more) in 150 parts by mass of water. Thereafter, the solution was applied on the surface of the polyolefin resin porous membrane by using a bar coater. Subsequently, the resulting membrane was dried at 60° C. to remove water to obtain a multilayer porous membrane having a total film thickness of 31 μm in which a porous layer with a thickness of 13 μm was formed on the porous membrane.

The resulting multilayer porous membrane maintained excellent permeability because it had an air permeability of 180 s/100 cc and the increasing rate of the air permeability caused by forming a porous layer was 44%, which is low. In addition, the TD thermal shrinkage rate at 150° C. was low at 3%, the MD thermal shrinkage rate at 150° C. was high at 32%, and the shutdown temperature was observed at 156° C., which is low.

Comparative Example 15

A mixture was prepared by mixing 19.2 parts by mass of polyethylene having a viscosity average molecular weight (Mv) of 1000000, 12.8 parts by mass of polyethylene having an Mv of 250000, 20 parts by mass of silica (the average particle diameter: 8.3 μm) and 48 parts by mass of dioctyl phthalate (DOP), and the mixture was granulated, followed by kneading and extruding with a twin-screw extruder equipped with a T-die to form into a sheet-like shape having a thickness of 90 μm. The DOP and the fine powder silica were extracted and removed from the resulting formed product with methylene chloride and with sodium hydroxide, respectively, to form a microporous membrane. The microporous membrane was stretched to 6.0 times in the machine direction while heating the microporous membrane at 110° C. and then was stretched to 2.0 times in the transverse direction while heating the microporous membrane at 130° C. As a result, there was obtained a polyolefin resin porous membrane having an MD maximum thermal shrinkage force of 23.5 g, a TD maximum thermal shrinkage force of 1.8 g, a film thickness of 16 μm, a porosity of 48% and an air permeability of 110 s/100 cc.

A solution was prepared by uniformly dispersing each of 95 parts by mass of titania particles (the average particle diameter: 0.4 μm) and 5 parts by mass of a polyvinyl alcohol (the average degree of polymerization: 1700, the degree of saponification: 99% or more) in 150 parts by mass of water. Thereafter, the solution was applied on the surface of the polyolefin resin porous membrane by using a gravure coater. Subsequently, the resulting membrane was dried at 60° C. to remove water to obtain a multilayer porous membrane having a total film thickness of 32 μm in which a porous layer with a thickness of 16 μm was formed on the porous membrane.

The resulting multilayer porous membrane was deteriorated in permeability because it had an air permeability of 780 s/100 cc and the increasing rate of the air permeability caused by forming a porous layer was approximately 600%, which is extremely high. In addition, the multilayer porous membrane was excellent in heat resistance because the MD thermal shrinkage rate at 150° C. was 5%, the TD thermal shrinkage rate at 150° C. was 3%, which are low, and the shutdown temperature was observed at 145° C. and short-circuit was not observed even at 200° C. or higher.

Comparative Example 16

When a similar evaluation was performed without forming a porous layer on the surface of the polyolefin resin porous membrane used for a substrate in Example 24, the MD thermal shrinkage rate at 150° C. was 69% and the TD thermal shrinkage rate at 150° C. was 67%, which are extremely high. In addition, the shutdown temperature was observed at 147° C., but the short-circuit temperature was observed at 149° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 17

When a similar evaluation was performed without forming a porous layer on the surface of the polyolefin resin porous membrane used for a substrate in Example 26, the MD thermal shrinkage rate at 150° C. was 68% and the TD thermal shrinkage rate at 150° C. was 64%, which are extremely high. In addition, the shutdown temperature was observed at 146° C., but the short-circuit temperature was observed at 153° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 18

When a similar evaluation was performed without forming a porous layer on the surface of the polyolefin resin porous membrane used for a substrate in Example 27, the MD thermal shrinkage rate at 150° C. was 74% and the TD thermal shrinkage rate at 150° C. was 54%, which are extremely high. In addition, the shutdown temperature was observed at 148° C., but the short-circuit temperature was observed at 152° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 19

When a similar evaluation was performed without forming a porous layer on the surface of the polyolefin resin porous membrane used for a substrate in Example 28, the MD thermal shrinkage rate at 150° C. was 80% or more and the TD thermal shrinkage rate at 150° C. was 20%, which are extremely high. In addition, the shutdown temperature was observed at 144° C., but the short-circuit temperature was observed at 153° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 20

When a similar evaluation was performed without forming a porous layer on the surface of the polyolefin resin porous membrane used for a substrate in Example 29, the MD thermal shrinkage rate at 150° C. was 57% and the TD thermal shrinkage rate at 150° C. was 59%, which are extremely high. In addition, the shutdown temperature was observed at 147° C., but the short-circuit temperature was observed at 153° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 21

When a similar evaluation was performed without forming a porous layer on the surface of the polyolefin resin porous membrane used for a substrate in Example 30, the MD thermal shrinkage rate at 150° C. was 60% and the TD thermal shrinkage rate at 150° C. was 50%, which are extremely high. In addition, the shutdown temperature was observed at 145° C., but the short-circuit temperature was observed at 155° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 22

When a similar evaluation was performed without forming a porous layer on the surface of the polyolefin resin porous membrane used for a substrate in Example 31, the MD thermal shrinkage rate at 150° C. was 68% and the TD thermal shrinkage rate at 150° C. was 51%, which are extremely high. In addition, the shutdown temperature was observed at 152° C., but the short-circuit temperature was observed at 155° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 23

When a similar evaluation was performed without forming a porous layer on the surface of the polyolefin resin porous membrane used for a substrate in Example 32, the MD thermal shrinkage rate at 150° C. was 69% and the TD thermal shrinkage rate at 150° C. was 62%, which are extremely high. In addition, the shutdown temperature was observed at 152° C., but the short-circuit temperature was observed at 154° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 24

When a similar evaluation was performed without forming a porous layer on the surface of the polyolefin resin porous membrane used for a substrate in Comparative Example 14, the MD thermal shrinkage rate at 150° C. was 80% or more and the TD thermal shrinkage rate at 150° C. was 23%, which are extremely high. In addition, the shutdown temperature was observed at 152° C., but the short-circuit temperature was observed at 153° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 25

When a similar evaluation was performed without forming a porous layer on the surface of the polyolefin resin porous membrane used for a substrate in Comparative Example 15, the MD thermal shrinkage rate at 150° C. was 80% or more and the TD thermal shrinkage rate at 150° C. was 24%, which are extremely high. In addition, the shutdown temperature was observed at 145° C., but the short-circuit temperature was observed at 147° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

The physical properties in the above Examples and Comparative Examples are collectively shown in Table 2.

TABLE 2

| | Polyolefin resin porous membrane | | | | Porous layer | | |
|---|---|---|---|---|---|---|---|
| | MD maximum thermal shrinkage force (g) | TD maximum thermal shrinkage force (g) | Film thickness (μm) | Air permeability (s/100 cc) | Resin binder | Inorganic filler | Layer thickness (mm) |
| Ex. 24 | 3.8 | 2.9 | 16 | 235 | PVA | Alumina | 4 |
| Ex. 25 | 3.8 | 2.9 | 16 | 235 | SB | Alumina | 7 |
| Ex. 26 | 4.8 | 3.7 | 20 | 280 | SB | Titania | 6 |
| Ex. 27 | 6.7 | 2.8 | 17 | 165 | PVA | Titania | 7 |
| Ex. 28 | 8.7 | 0.9 | 11 | 55 | PVA | Titania | 8 |
| Ex. 29 | 3.6 | 3.3 | 12 | 230 | PVA | Alumina | 8 |
| Ex. 30 | 3.2 | 3.1 | 16 | 165 | PVA | Alumina | 5 |
| Ex. 31 | 6.0 | 2.1 | 16 | 190 | PVA | Alumina | 6 |
| Ex. 32 | 4.9 | 3.7 | 25 | 290 | PVA | Alumina | 6 |
| Com. Ex. 14 | 12.9 | 1.2 | 18 | 125 | PVA | Titania | 13 |
| Com. Ex. 15 | 23.5 | 1.8 | 16 | 110 | PVA | Titania | 16 |
| Com. Ex. 16 | 3.8 | 2.9 | 16 | 235 | — | — | 0 |
| Com. Ex. 17 | 4.8 | 3.7 | 20 | 280 | — | — | 0 |
| Com. Ex. 18 | 6.7 | 2.8 | 17 | 165 | — | — | 0 |
| Com. Ex. 19 | 8.7 | 0.9 | 11 | 55 | — | — | 0 |
| Com. Ex. 20 | 3.6 | 3.3 | 12 | 230 | — | — | 0 |
| Com. Ex. 21 | 3.2 | 3.1 | 16 | 165 | — | — | 0 |
| Com. Ex. 22 | 6.0 | 2.1 | 16 | 190 | — | — | 0 |
| Com. Ex. 23 | 4.9 | 3.7 | 25 | 290 | — | — | 0 |
| Com. Ex. 24 | 12.9 | 1.2 | 18 | 125 | — | — | 0 |
| Com. Ex. 25 | 23.5 | 1.8 | 16 | 110 | — | — | 0 |

| | Multilayer porous membrane | | | | | |
|---|---|---|---|---|---|---|
| | Air permeability (s/100 cc) | Increasing rate of air permeability (%) | 150° C. MD thermal shrinkage rate (%) | 150° C. TD thermal shrinkage rate (%) | Shutdown temperature (° C.) | Short-circuit temperature (° C.) |
| Ex. 24 | 255 | 9 | 3 | 3 | 146 | >200 |
| Ex. 25 | 280 | 19 | 2 | 2 | 145 | >200 |
| Ex. 26 | 315 | 13 | 8 | 5 | 147 | >200 |
| Ex. 27 | 200 | 21 | 5 | 4 | 144 | >200 |
| Ex. 28 | 240 | 336 | 4 | 3 | 150 | >200 |
| Ex. 29 | 330 | 43 | 2 | 2 | 147 | >200 |
| Ex. 30 | 180 | 9 | 3 | 2 | 145 | >200 |
| Ex. 31 | 210 | 11 | 5 | 3 | 145 | >200 |
| Ex. 32 | 310 | 7 | 2 | 2 | 147 | >200 |
| Com. Ex. 14 | 180 | 44 | 32 | 3 | 150 | 156 |
| Com. Ex. 15 | 780 | 609 | 5 | 3 | 145 | >200 |
| Com. Ex. 16 | 235 | 0 | 69 | 67 | 147 | 149 |
| Com. Ex. 17 | 280 | 0 | 68 | 64 | 146 | 153 |
| Com. Ex. 18 | 165 | 0 | 74 | 54 | 148 | 152 |
| Com. Ex. 19 | 55 | 0 | >80 | 20 | 144 | 153 |
| Com. Ex. 20 | 230 | 0 | 57 | 59 | 147 | 153 |
| Com. Ex. 21 | 165 | 0 | 60 | 50 | 145 | 155 |
| Com. Ex. 22 | 190 | 0 | 68 | 51 | 152 | 155 |
| Com. Ex. 23 | 290 | 0 | 69 | 62 | 152 | 154 |
| Com. Ex. 24 | 125 | 0 | >80 | 23 | 152 | 153 |
| Com. Ex. 25 | 110 | 0 | >80 | 24 | 145 | 147 |

PVA: Polyvinyl alcohol
SB: SB latex

Example 33

A solution was prepared by uniformly dispersing each of 5 parts by mass of a polyvinyl alcohol (the average degree of polymerization: 1700, the degree of saponification: 99% or more) and 95 parts by mass of titania particles (the average particle diameter: 0.4 μm) in 150 parts by mass of water. Thereafter, the solution was applied on the surface of the polyolefin resin porous membrane used for a substrate in Example 27 by using a gravure coater. Subsequently, the resulting membrane was dried at 60° C. to remove water to obtain a multilayer porous membrane having a total film thickness of 20 μm in which a porous layer with a thickness of 4 μm was formed on the porous membrane.

The resulting multilayer porous membrane maintained excellent permeability because it had an air permeability of 175 s/100 cc and the increasing rate of the air permeability caused by forming a porous layer was 6%, which is low. In addition, the multilayer porous membrane showed extremely high heat resistance because the shutdown temperature was observed at 148° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 34

There was obtained a multilayer porous membrane having a total film thickness of 22 μm in the same manner as in Example 33 except that in Example 33, a porous layer with a thickness of 6 μm was formed on the porous membrane.

The resulting multilayer porous membrane maintained excellent permeability because it had an air permeability of 180 s/100 cc and the increasing rate of the air permeability caused by forming a porous layer was 9%, which is low. In addition, the multilayer porous membrane showed extremely high heat resistance because the shutdown temperature was observed at 146° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 35

A solution was prepared by uniformly dispersing each of 5 parts by mass of a polyvinyl alcohol (the average degree of polymerization: 1700, the degree of saponification: 87%) and 95 parts by mass of titania particles (the average particle diameter: 0.4 μm) in 150 parts by mass of water. Thereafter, the solution was applied on the surface of the polyolefin resin porous membrane used for a substrate in Example 27 by using a bar coater. Subsequently, the resulting membrane was dried at 60° C. to remove water to obtain a multilayer porous membrane having a total film thickness of 19 μm in which a porous layer with a thickness of 3 μm was formed on the porous membrane.

The resulting multilayer porous membrane maintained excellent permeability because it had an air permeability of 171 s/100 cc and the increasing rate of the air permeability caused by forming a porous layer was 4%, which is low. In addition, the multilayer porous membrane showed extremely high heat resistance because the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 36

There was obtained a multilayer porous membrane having a total film thickness of 22 μm in the same manner as in Example 35 except that in Example 35, a porous layer with a thickness of 6 μm was formed on the porous membrane.

The resulting multilayer porous membrane maintained excellent permeability because it had an air permeability of 178 s/100 cc and the increasing rate of the air permeability caused by forming a porous layer was 8%, which is low. In addition, the multilayer porous membrane showed extremely high heat resistance because the shutdown temperature was observed at 146° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 37

There was obtained a multilayer porous membrane having a total film thickness of 18 μm in the same manner as in Example 35 except that in Example 27, corona discharge treatment (the discharge amount: 50 W) was performed on the surface of the polyolefin resin porous membrane and then a porous layer was formed on the treated surface (the wetting index of the surface: 73 mN/m or more).

The resulting multilayer porous membrane maintained excellent permeability because it had an air permeability of 170 s/100 cc and the increasing rate of the air permeability caused by forming a porous layer was 3%, which is low. In addition, the multilayer porous membrane showed extremely high heat resistance because the shutdown temperature was observed at 145° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Comparative Example 26

When a similar evaluation was performed without forming a porous layer on the surface of the polyolefin resin porous membrane used for a substrate in Example 27, the shutdown temperature was observed at 148° C., but the short-circuit temperature was observed at 152° C., which is low. Further, according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 27

A solution was prepared by uniformly dispersing each of 5 parts by mass of a polyvinyl alcohol (the average degree of polymerization: 1700, the degree of saponification: 81%) and 95 parts by mass of titania particles (the average particle diameter: 0.4 μm) in 150 parts by mass of water. Thereafter, the solution was applied on the surface of the polyolefin resin porous membrane used for a substrate in Example 27 by using a bar coater. Subsequently, the resulting membrane was dried at 60° C. to remove water to obtain a multilayer porous membrane having a total film thickness of 20 μm in which a porous layer with a thickness of 4 μm was formed on the porous membrane.

The resulting multilayer porous membrane maintained excellent permeability because it had an air permeability of 174 s/100 cc and the increasing rate of the air permeability caused by forming a porous layer was 5%, which is low. The shutdown temperature was observed at 145° C., but the short-circuit temperature was observed at 163° C., which is low.

Comparative Example 28

There was obtained a multilayer porous membrane having a total film thickness of 22 μm in the same manner as in Comparative Example 27 except that in Comparative Example 27, a porous layer with a thickness of 6 μm was formed on the porous membrane.

The resulting multilayer porous membrane maintained excellent permeability because it had an air permeability of 178 s/100 cc and the increasing rate of the air permeability caused by forming a porous layer was 8%, which is low. The shutdown temperature was observed at 145° C., but the short-circuit temperature was observed at 167° C., which is low.

Comparative Example 29

A solution was prepared by uniformly dispersing each of 5 parts by mass of a polyvinyl alcohol (the average degree of polymerization: 1700, the degree of saponification: 72%) and 95 parts by mass of titania particles (the average particle diameter: 0.4 μm) in 150 parts by mass of water. Thereafter, the solution was applied on the surface of the polyolefin resin porous membrane used for a substrate in Example 27 by using a bar coater. Subsequently, the resulting membrane was dried at 60° C. to remove water to obtain a multilayer porous membrane having a total film thickness of 22 μm in which a porous layer with a thickness of 6 μm was formed on the porous membrane.

The resulting multilayer porous membrane maintained excellent permeability because it had an air permeability of 177 s/100 cc and the increasing rate of the air permeability caused by forming a porous layer was 7%, which is low. The shutdown temperature was observed at 146° C., but the short-circuit temperature was observed at 162° C., which is low.

The physical properties in the above Examples and Comparative Examples are collectively shown in Table 3.

Example 38

When the surface of the polyolefin resin porous membrane used for a substrate in Example 31 was subjected to corona discharge treatment with a discharge amount of 50 W, the wetting index of the surface was 73 mN/m or more. A solution was prepared by uniformly dispersing each of 90 parts by mass of titania particles (the average particle diameter: 0.4 μm) and 10 parts by mass of a polyphenylene ether (having a reduction viscosity of 0.51 and a glass transition temperature of 209° C., obtained by the oxidation polymerization of 2,6-xylenol) in 200 parts by mass of toluene. Thereafter, the solution was applied on the treated surface by using a bar coater. Subsequently, the resulting membrane was dried at 60° C. to remove toluene to obtain a multilayer porous membrane having a total film thickness of 22 μm in which a porous layer with a thickness of 6 μm was formed on the porous membrane.

The resulting multilayer porous membrane maintained excellent permeability because it had an air permeability of 260 s/100 cc and the increasing rate of the air permeability caused by forming a porous layer was 33%, which is low. In addition, the multilayer porous membrane showed extremely high heat resistance because the shutdown temperature was observed at 149° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Example 39

There was obtained a multilayer porous membrane having a total film thickness of 22 μm in the same manner as in Example 38 except that in Example 38, the surface of the polyolefin resin porous membrane was subjected to corona discharge treatment with a discharge amount of 20 W and the wetting index of the surface was 45 mN/m.

The resulting multilayer porous membrane maintained excellent permeability because it had an air permeability of 270 s/100 cc and the increasing rate of the air permeability caused by forming a porous layer was 38%, which is low. In addition, the multilayer porous membrane showed extremely high heat resistance because the shutdown temperature was observed at 148° C. and short-circuit was not observed even at 200° C. or higher.

According to the battery evaluation performed by using the multilayer porous membrane as a separator, it was found that

TABLE 3

| | Porous layer | | Multilayer porous membrane | | | |
|---|---|---|---|---|---|---|
| | Degree of saponification PVA (%) | Layer thickness of porous layer (mm) | Air permeability (s/100 cc) | Increasing rate of air permeability (%) | Shutdown temperature (° C.) | Short-circuit temperature (° C.) |
| Ex. 33 | >99 | 4 | 175 | 6 | 148 | >200 |
| Ex. 34 | >99 | 6 | 180 | 9 | 146 | >200 |
| Ex. 35 | 87 | 3 | 171 | 4 | 145 | >200 |
| Ex. 36 | 87 | 6 | 178 | 8 | 146 | >200 |
| Ex. 37 | 87 | 2 | 170 | 3 | 145 | >200 |
| Com. Ex. 26 | — | 0 | 165 | 0 | 148 | 152 |
| Com. Ex. 27 | 81 | 4 | 174 | 5 | 145 | 163 |
| Com. Ex. 28 | 81 | 6 | 178 | 8 | 145 | 167 |
| Com. Ex. 29 | 72 | 6 | 177 | 7 | 146 | 162 |

the rate property was 90% or more, which is high, and the cycle property was excellent because the capacity maintenance rate after 100 cycles was 90% or more.

Example 40

When the surface of the polyolefin resin porous membrane used for a substrate in Example 31 was subjected to corona discharge treatment with a discharge amount of 50 W, the wetting index of the surface was 73 mN/m or more. A solution was prepared by uniformly dispersing each of 90 parts by mass of alumina particles (the average particle diameter: 0.7 μm) and 10 parts by mass of a polyvinyl alcohol (the average degree of polymerization: 1700, the degree of saponification: 99% or more) in 150 parts by mass of water. Thereafter, the solution was applied on the treated surface by using a gravure coater. Subsequently, the resulting membrane was dried at 60° C. to remove water to obtain a multilayer porous membrane having a total film thickness of 19 μm in which a porous layer with a thickness of 3 μm was formed on the porous membrane.

The resulting multilayer porous membrane maintained excellent permeability because it had an air permeability of 245 s/100 cc and the increasing rate of the air permeability caused by forming a porous layer was 26%, which is low. In addition, the multilayer porous membrane showed extremely high heat resistance because the shutdown temperature was observed at 146° C. and short-circuit was not observed even at 200° C. or higher.

According to the battery evaluation performed by using the multilayer porous membrane as a separator, it was found that the rate property was 90% or more, which is high, and the cycle property was excellent because the capacity maintenance rate after 100 cycles was 90% or more.

Comparative Example 30

The wetting index of the surface of the polyolefin resin porous membrane used for a substrate in Example 31 was 38 mN/m. A solution was prepared by uniformly dispersing each of 90 parts by mass of titania particles (the average particle diameter: 0.4 μm) and 10 parts by mass of a polyphenylene ether (having a reduction viscosity of 0.51 and a glass transition temperature of 209° C., obtained by the oxidation polymerization of 2,6-xylenol) in 200 parts by mass of toluene. Thereafter, the solution was applied on the surface by using a bar coater. Subsequently, the resulting membrane was dried at 60° C. to remove toluene to obtain a multilayer porous membrane having a total film thickness of 26 μm in which a porous layer with a thickness of 6 μm was formed on the porous membrane.

The resulting multilayer porous membrane was deteriorated in permeability because it had an air permeability of 410 s/100 cc and the increasing rate of the air permeability caused by forming a porous layer was 110%, which is high.

According to the battery evaluation performed by using the multilayer porous membrane as a separator, it was found that the rate property was approximately 80%, which is low, and the capacity maintenance rate after 100 cycles was approximately 70%, which is low.

In addition, the multilayer porous membrane showed extremely high heat resistance because the shutdown temperature was observed at 150° C. and short-circuit was not observed even at 200° C. or higher.

Comparative Example 31

The wetting index of the surface of the polyolefin resin porous membrane used for a substrate in Example 31 was 38 mN/m. A solution was prepared by uniformly dispersing each of 90 parts by mass of alumina particles (the average particle diameter: 0.7 μm) and 10 parts by mass of a polyvinyl alcohol (the average degree of polymerization: 1700, the degree of saponification: 99% or more) in 150 parts by mass of water. Thereafter, the solution was applied on the surface by using a gravure coater. Subsequently, the resulting membrane was dried at 60° C. to remove water to obtain a multilayer porous membrane having a total film thickness of 19 μm in which a porous layer with a thickness of 3 μm was formed on the porous membrane.

The resulting multilayer porous membrane was deteriorated in permeability because it had an air permeability of 360 s/100 cc and the increasing rate of the air permeability caused by forming a porous layer was 85%, which is high.

According to the battery evaluation performed by using the multilayer porous membrane as a separator, it was found that the rate property was approximately 80%, which is low, and the capacity maintenance rate after 100 cycles was approximately 70%, which is low.

In addition, the multilayer porous membrane showed extremely high heat resistance because the shutdown temperature was observed at 146° C. and short-circuit was not observed even at 200° C. or higher.

Comparative Example 32

The wetting index of the surface of the polyolefin resin porous membrane used for a substrate in Example 31 was 38 mN/m. When a similar evaluation was performed without forming a porous layer on the surface of the porous membrane, the shutdown temperature was observed at 147° C., but the short-circuit temperature was observed at 154° C., which is low.

In addition, the porous membrane shoed excellent permeability because it had an air permeability of 195 s/100 cc, and according to the battery evaluation performed by using the multilayer porous membrane as a separator, it was found that the rate property was 90% or more, which is high, and the cycle property was also excellent because the capacity maintenance rate after 100 cycles was 90% or more.

Comparative Example 33

When the surface of the polyolefin resin porous membrane used for a substrate in Example 31 was subjected to corona discharge treatment with a discharge amount of 50 W, the wetting index of the surface was 73 mN/m or more. When a similar evaluation was performed without forming a porous layer on the surface of the porous membrane, the shutdown temperature was observed at 153° C., but the short-circuit temperature was observed at 157° C., which is low.

In addition, the porous membrane showed excellent permeability because it had an air permeability of 195 s/100 cc, and according to the battery evaluation performed by using the multilayer porous membrane as a separator, it was found that the rate property was 90% or more, which is high, and the cycle property was also excellent because the capacity maintenance rate after 100 cycles was 90% or more.

The physical properties in the above Examples and Comparative Examples are collectively shown in Table 4.

TABLE 4

| | Polyolefin resin porous membrane | | | | Porous layer | | | Multilayer porous membrane | | | |
|---|---|---|---|---|---|---|---|---|---|---|---|
| | Corona discharge amount (W) | Wetting index (mN/m) | Film thickness (μm) | Air permeability (s/100 cc) | Resin binder | Inorganic filler | Layer thickness (μm) | Air permeability (s/100 cc) | Increasing rate of air permeability (%) | Shutdown temperature (° C.) | Short-circuit temperature (° C.) |
| Ex. 38 | 50 | >73 | 16 | 190 | PPE | Titania | 6 | 260 | 37 | 149 | >200 |
| Ex. 39 | 20 | 45 | 16 | 190 | PPE | Titania | 6 | 270 | 42 | 148 | >200 |
| Ex. 40 | 50 | >73 | 16 | 190 | PVA | Alumina | 3 | 245 | 29 | 146 | >200 |
| Com. Ex. 30 | — | 38 | 16 | 190 | PPE | Titania | 6 | 410 | 116 | 150 | >200 |
| Com. Ex. 31 | — | 38 | 16 | 190 | PVA | Alumina | 3 | 360 | 89 | 146 | >200 |
| Com. Ex. 32 | — | 38 | 16 | 190 | — | — | 0 | 190 | 0 | 152 | 155 |
| Com. Ex. 33 | 50 | >73 | 16 | 190 | — | — | 0 | 190 | 0 | 153 | 157 |

PPE: Polyphenylene ether
PVA: Polyvinyl alcohol

The invention claimed is:

1. A separator for a non-aqueous electrolyte battery comprising a multilayer porous membrane comprising a porous layer containing an inorganic filler and a resin binder adhered to at least one surface of a polyolefin resin porous membrane, wherein the porous layer simultaneously satisfies the following (A) to (C):

(A) the inorganic filler has an average particle diameter of 0.1 μm or more and 3.0 μm urn or less, (B) a ratio of an amount of the resin binder to a total amount of the inorganic filler and the resin binder is 0.5% or more and 8% or less in terms of volume fraction, (C) a ratio of a layer thickness of the porous layer to a total layer thickness of the porous layer and the polyolefin resin porous membrane is 15% or more and 50% or less, and wherein a maximum MD value of a load generated as the polyolefin resin porous membrane was heated from temperature of 30° C. to 200° C. is 7 g or less.

2. The separator according to claim 1, wherein the resin binder is a polyvinyl alcohol having a degree of saponification of 85% or more.

3. The separator according to claim 1, wherein the polyolefin resin porous membrane surface facing the porous layer has a wetting index of 40 mN/m or more.

4. A non-aqueous electrolyte battery using a separator according to claim 1.

5. A method of producing the separator according to claim 1, comprising applying a dispersion solution containing the inorganic filler and the resin binder on at least one surface of the polyolefin resin porous membrane.

* * * * *